US012633749B2

(12) United States Patent (10) Patent No.: US 12,633,749 B2
Alotaibi et al. (45) Date of Patent: May 19, 2026

(54) SYSTEM AND METHOD FOR AN ADVANCED DISTRIBUTED MULTI-AGENT CONSENSUS BASED-VIRTUAL INERTIA CONTROLLER FOR LOW INERTIAL MICROGRIDS

(71) Applicant: KING FAHD UNIVERSITY OF PETROLEUM AND MINERALS, Dhahran (SA)

(72) Inventors: Ibrahim Mohammad K. Alotaibi, Dhahran (SA); Mohamed Ali Abido, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/420,187

(22) Filed: Jan. 23, 2024

(65) Prior Publication Data

US 2025/0226662 A1 Jul. 10, 2025

Related U.S. Application Data

(60) Provisional application No. 63/619,603, filed on Jan. 10, 2024.

(51) Int. Cl.
*H02J 3/32* (2026.01)
*H02J 3/001* (2026.01)
(Continued)

(52) U.S. Cl.
CPC ................ *H02J 3/32* (2013.01); *H02J 3/001* (2020.01); *H02J 3/388* (2020.01); *H02J 7/52* (2026.01);
(Continued)

(58) Field of Classification Search
CPC .... H02J 3/32; H02J 3/001; H02J 3/388; H02J 7/0014; H02J 2203/10; H02J 2203/20
See application file for complete search history.

(56) References Cited

U.S. PATENT DOCUMENTS

2015/0311716 A1 10/2015 He et al.

FOREIGN PATENT DOCUMENTS

CN 113193245 B 10/2022
CN 115912435 A * 4/2023
(Continued)

OTHER PUBLICATIONS

Bhargavi Krishna Metihalli, et al., "Disturbance Observer Based Distributed Consensus Control Strategy of Multi-Agent System with External Disturbance in a Standalone DC Microgrid", Asian Journal of Control, vol. 23, Issue 2, Mar. 2021, pp. 920-936.
(Continued)

*Primary Examiner* — Daniel Cavallari
(74) *Attorney, Agent, or Firm* — Oblon, McClelland, Maier & Neustadt, L.L.P.

(57) ABSTRACT

A device, method, and non-transitory computer readable medium for controlling a power distribution system includes an islanded microgrid and a control system. The islanded microgrid includes battery energy storage systems (BESSs) that operate as a primary energy source, and a decentralized consensus-based virtual synchronous generator (VSG). The control system simultaneously, emulates inertial response of a synchronous generator by the virtual synchronous generator during grid disruptions to regulate and stabilizes frequency of the islanded microgrid, and maintain consensus among the plurality of battery energy storage systems (BESSs).

12 Claims, 23 Drawing Sheets

(51) Int. Cl.
    *H02J 3/388*      (2026.01)
    *H02J 7/52*       (2026.01)
    *H02J 103/30*    (2026.01)
    *H02J 103/35*    (2026.01)

(52) U.S. Cl.
    CPC ....... *H02J 2103/30* (2026.01); *H02J 2103/35* (2026.01)

(56)           References Cited

FOREIGN PATENT DOCUMENTS

| | | | | | |
|---|---|---|---|---|---|
| CN | 117335476 A | * | 1/2024 | ................ | H02J 3/32 |
| CN | 117394387 A | * | 1/2024 | ............. | H02J 3/241 |
| CN | 114301078 B | * | 11/2024 | | |
| KR | 102798457 B1 | * | 4/2025 | ........... | H02J 7/0047 |
| WO | WO-2021173136 A1 | * | 9/2021 | ................ | H02J 3/50 |

OTHER PUBLICATIONS

Haodong Zhao, et al., "SOC Balanced Power Distribution Control Strategy of a DC-DC Converter with Virtual Synchronous Generator", Electronics, vol. 11, Issue 23, Nov. 30, 2022, pp. 1-10.
Mahmuda Begum, "Distributed Cooperative Control for Autonomous Microgrids", University of Technology Sydney (UTS), Aug. 2021, 154 pages.

* cited by examiner

2000

Simultaneously, emulating inertial response of a synchronous generator by the virtual synchronous generator during grid disruptions, to regulate and stabilize frequency of an islanded microgrid                    2002

Maintaining consensus among the plurality of battery energy storage systems (BESSs) operating as a primary energy source in the VSG                    2004

SYSTEM AND METHOD FOR AN ADVANCED DISTRIBUTED MULTI-AGENT CONSENSUS BASED-VIRTUAL INERTIA CONTROLLER FOR LOW INERTIAL MICROGRIDS

CROSS-REFERENCE TO RELATED APPLICATIONS

This application claims the benefit of priority to provisional application No. 63/619,603 filed Jan. 10, 2024, the entire contents of which are incorporated herein by reference.

STATEMENT REGARDING PRIOR DISCLOSURE BY THE INVENTORS

Aspects of this technology are described in an article, I. Alotaibi and M. Abido, "Distributed Multi-agent Consensus-Based Virtual Inertia Control of Low Inertial Microgrids," 2023 IEEE Power & Energy Society General Meeting (PESGM), Orlando, FL, USA, 2023, pp. 1-5, doi: 10.1109/PESGM52003.2023.10252173, and is herein incorporated by reference in its entirety.

BACKGROUND

Technical Field

The present disclosure is directed to voltage regulation for microgrids with low inertia. More particularly, the present disclosure relates to system and method for an advanced distributed multi-agent consensus based-virtual inertia controller for microgrids.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Centralized power systems have been powered for decades by fossil fuel-based power plants. Centralized power plants designed to deliver large amounts of electricity across hundreds of miles over transmission systems are gradually being decommissioned and replaced by smaller, more intelligent, decentralized energy sources. In a decentralized power system, the energy is drawn from multiple localized minimal networks. As the number of energy suppliers grows, deploying local solar plants, small-scale wind farms, battery storage, and combined heat-and-power plants can promote competition and bring down electricity prices.

Inertia in a power grid refers to the energy stored in large rotating generators and motors, which provides the capability to remain rotating. This stored energy can be particularly valuable when other generators or a whole a power plant fails, as it can temporarily make up for the power lost from the failed generators. Grid frequency, which is a measure of the balance of supply of electricity and demand, can drop if a large power plant or transmission fails. Inertia resists this drop in frequency, giving the grid time to rebalance supply and demand.

As an alternative to fossil fuel, the trend is towards using renewable-based resources, such as wind, solar and photovoltaic (PV), etc. The growing adoption of renewable-based resources is designed to replace existing conventional power generation. However, it may also induce inevitable stability and robustness issues. For example, the stochastic nature of wind and solar power poses critical challenges to the network's operation and control, especially in islanded microgrids. To tackle uncertainties in receiving continuous power from renewable-based resources, energy storage systems (ESSs), such as batteries can be deployed to regulate the frequency in islanded microgrids that, on the other side, emulate the behavior of synchronous generators. However, the decentralized infrastructures necessitate advancing the control paradigm and developing decentralized control schemes.

Recently, cooperative control layouts have facilitated decentralization. The cooperative control can be classified into three broader categories. The first control strategy is a fully decentralized control that uses local information and does not require communication among the units, making it less expensive and robust. However, it lacks broader information and may not effectively utilize all existing information. The second control strategy is to apply a centralized control scheme, where a central controller independently coordinates all operations of units. Such a control scheme requires communication between the central controller and the controlled units, which makes it expensive and prone to single-point failure. The third control strategy is the distributed control strategy, which requires communication among multiple agents through a local network. The distributed control strategy has been proved to be superior in terms of cost and complexity compared to other two strategies. However, a fundamental problem in distributed control strategy is the development of a consensus-based algorithm.

Over the past years and with further research in this area, consensus-based techniques or algorithms have been widely adopted in power system applications to coordinate behavior of agents to achieve a particular control objective. For example, in the art, a fully distributed dispatching algorithm of aggregated flywheel storage system integrated with wind farms based on consensus control has been proposed, that considers both directed and unbalanced undirected graphs. In another research work, a distributed control layout has been proposed to regulate the output power of a doubly fed induction generator-based wind turbine and battery energy storage systems. The proposed architecture was designed to control adjacent wind turbines and BESS. The control strategy was able to equalize the ratio of the power of the multi-agent system and the wind turbine under various wind speed modes. The multi-agent consensus control was extended further to frequency recovery applications, for example, advances in research in this area explored a multistage control based on a primary frequency controller and a consensus control to synchronize the state of charge (SOC) and power levels of batteries in an AC microgrid. The control strategies of BESSs operating collectively in decentralized power systems are not only limited to energy and power-sharing but can also cover the synchronization of other states such as voltage, energy levels, and complex power sharing. Another consensus-based control scheme has further been proposed to regulate the charging/discharging patterns of BESSs using a local droop-based control method and a distributed control scheme to maintain the voltage profile within the nominal bounds. Further research presented a nonlinear novel multi-agent sliding mode control for balancing the state of charge of BESSs in a DC microgrid.

Conventional systems and grids have one or more limitations that hinder their adoption. For example, all conventional approaches overlook the dynamics of the batteries operating in the virtual control units for microgrids while using consensus-based algorithms. Failure to consider battery dynamics may cause improper utilization among the batteries. For example, one battery may get completely depleted early, while others might not, at the time of stabilizing the microgrid. This situation may cause an imbalance of a state of charge in batteries.

Accordingly, an object of the present disclosure is to provide a method and a system that is configured to consider the real time dynamics of the batteries in terms of state of charge, power and capacity, while regulating the frequency by emulating the behavior of synchronous generators with inertia during disturbances.

SUMMARY

In an exemplary embodiment, a power distribution system is disclosed. The power distribution system comprises an islanded microgrid and a control system. The islanded microgrid includes a plurality of battery energy storage systems (BESSs) configured to operate as a primary energy source. The islanded microgrid further includes a decentralized consensus-based virtual synchronous generator (VSG). The control system is configured to, simultaneously, emulate inertial response of a synchronous generator by the virtual synchronous generator during grid disruptions, to regulate and stabilize frequency of the islanded microgrid, and maintain consensus among the plurality of battery energy storage systems (BESSs).

In an embodiment, the plurality of battery energy storage systems are controlled by a multi-agent system in the islanded microgrid, and maintain consensus comprises the multi-agent system synchronizing power and State of Charge (SOC) of the plurality of battery energy storage systems.

In an embodiment, the VSG comprises a VSG unit that includes a grid-connected inverter, bidirectional converters, and the multi-agent BESSs, and the control system is configured to control the grid-connected inverter, bidirectional converters, and the plurality of BESSs as a decentralized power grid-forming unit.

In an embodiment, the VSG regulates the frequency of the islanded microgrid through a rate of change of frequency (ROCOF) control loop.

In an embodiment, the ROCOF control loop generates required inertial power to regulate the frequency.

In an embodiment, the islanded microgrid comprises a synchronous generator and a doubly fed induction generator.

In an embodiment, the Virtual Synchronous Generator (VSG) unit is integrated into the power grid through the grid-connected inverter.

In an embodiment, the plurality of BESSs are a group of heterogenous lithium-ion batteries attached to a DC-link of the grid-connected inverter.

In an embodiment, the multi-agent system includes a local consensus controller.

In an embodiment, the plurality of BESSs is controlled by a double-integrator leader-follower multi-agent system.

In an embodiment, the power distribution system is further configured to control followers in the leader-follower multi-agent system to simultaneously track a global leader signal and achieve consensus in the power and state of charge (SOC) of the BESSs as the followers.

In an embodiment, the consensus controller generates individual reference powers and sends the reference powers to lower-level controllers of bidirectional converters.

In an embodiment, the consensus controller tracks power state of the leader and equalizes the state of charge (SOC) of the BESSs as the followers.

In another exemplary embodiment, a method of controlling a power distribution system having an islanded microgrid and a control system is disclosed. The islanded microgrid includes a plurality of battery energy storage systems (BESSs) operating as a primary energy source, and a decentralized consensus-based virtual synchronous generator (VSG). The control system is configured to implement the method comprising, simultaneously, emulating inertial response of a synchronous generator by the virtual synchronous generator during grid disruptions, to regulate and stabilize frequency of an islanded microgrid, and maintaining consensus among the plurality of battery energy storage systems (BESSs) operating as a primary energy source in the VSG.

In an embodiment, the plurality of battery energy storage systems are controlled by a multi-agent system in the islanded microgrid, the maintaining step comprises synchronizing, by the multi-agent system, power and State of Charge (SOC) for the plurality of battery energy storage systems controlled by the multi-agent system in the islanded microgrid.

In an embodiment, the VSG comprises a VSG unit that includes a grid-connected inverter, bidirectional converters, and the multi-agent BESSs, and the control system is configured to implement the method comprising controlling the grid-connected inverter, bidirectional converters, and the plurality of BESSs as a decentralized power grid-forming unit.

In an embodiment, the method further comprising regulating, by the VSG, the frequency of the islanded microgrid through a rate of change of frequency (ROCOF) control loop.

In an embodiment, the method further comprising generating, by the ROCOF control loop, required inertial power to regulate the frequency.

In an embodiment, the multi-agent system of BESSs is configured as a double-integrator leader-follower multi-agent system, and the method further comprising controlling BESSs as the followers in the leader-follower multi-agent system to simultaneously track a global leader signal and achieve consensus in the power and state of charge (SOC) of the BESSs as the followers.

In an embodiment, the method further comprising generating, by the consensus controller, individual reference powers and sending the reference powers to lower-level controllers of bidirectional converters.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

5

Figure 2:
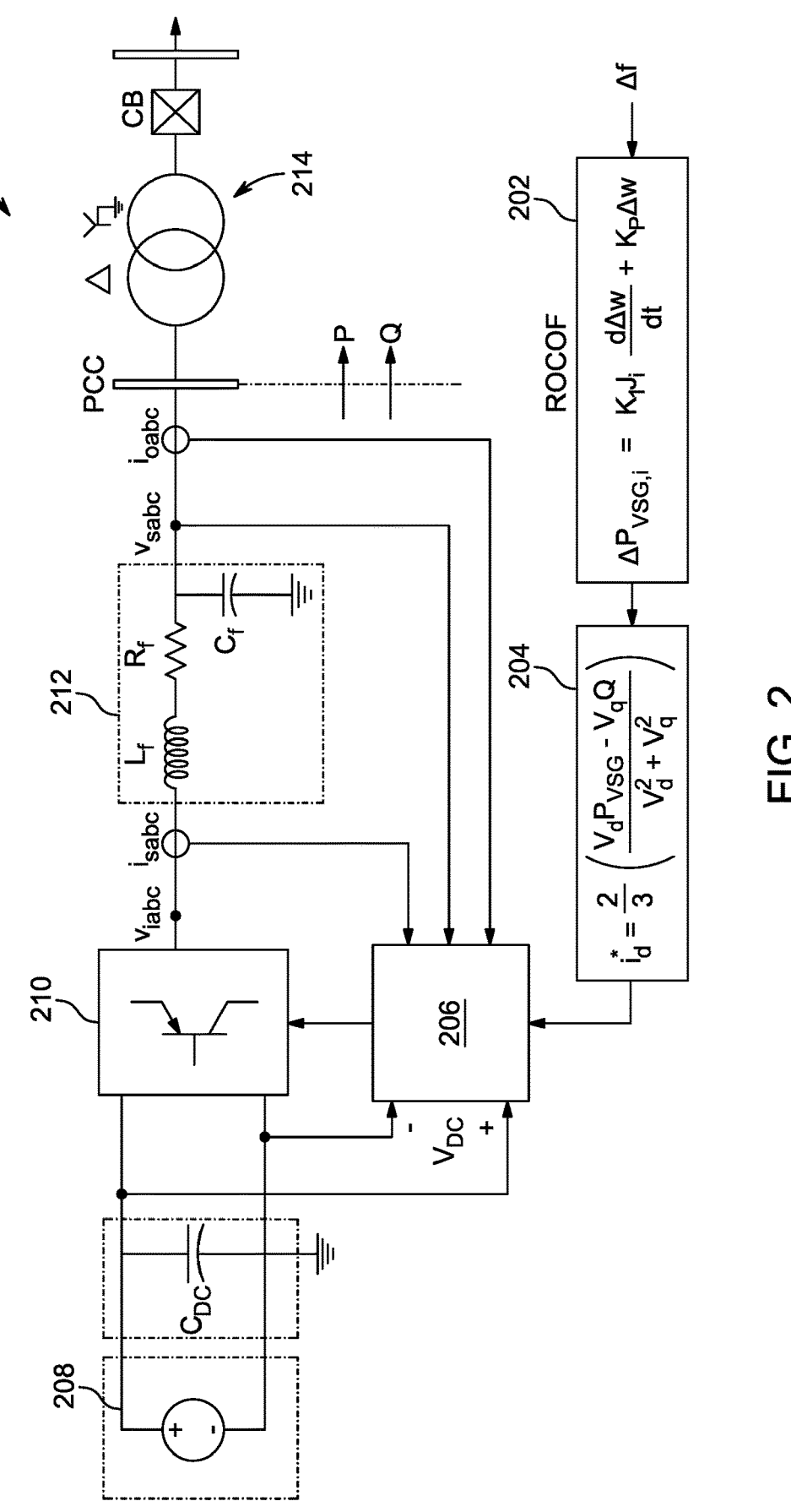

FIG. 2 illustrates a microgrid layout in detail, according to certain embodiments.

Figure 3:
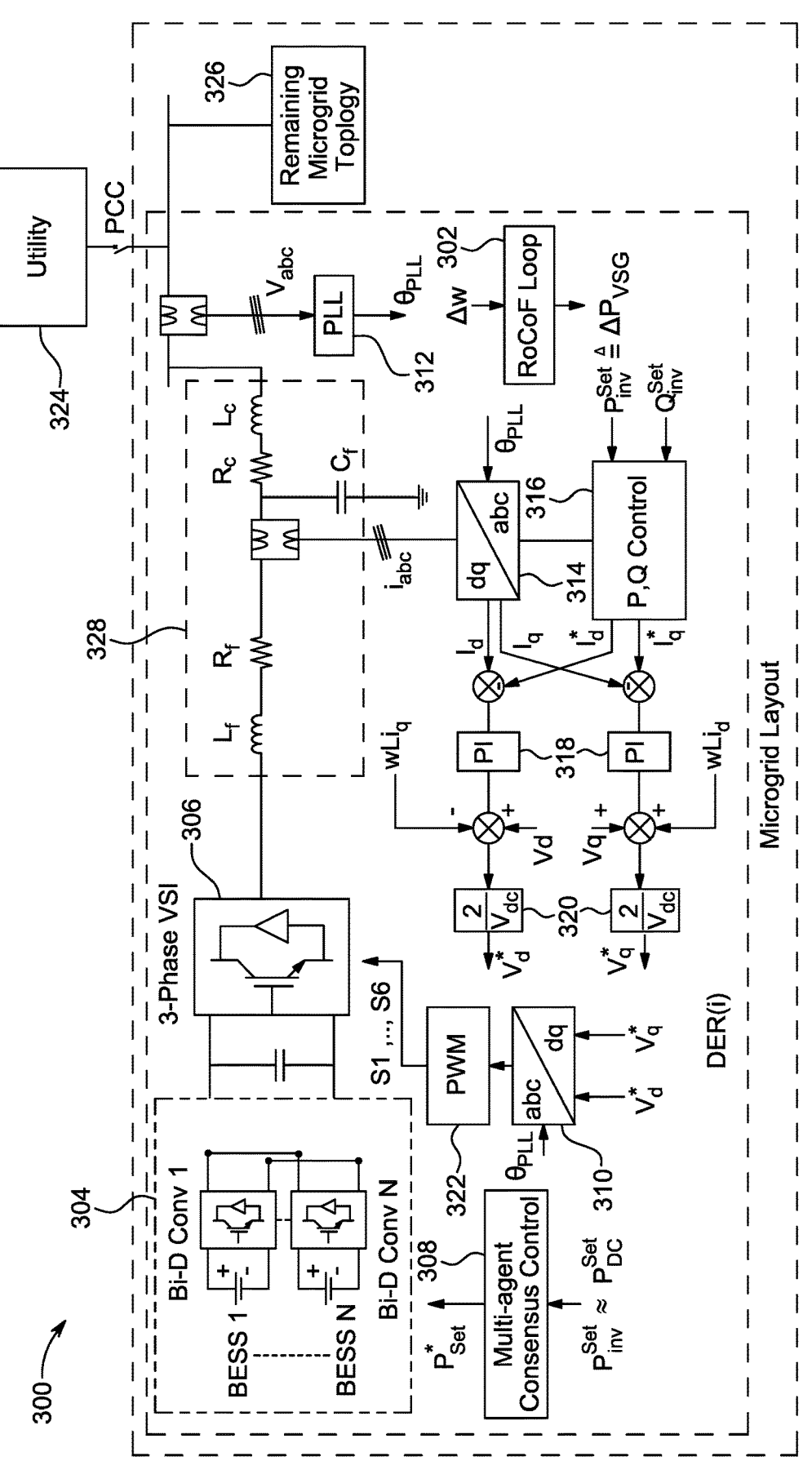

FIG. 3 illustrates a general layout of a microgrid with ROCOF loop and a current controller, according to certain embodiments.

Figure 4:
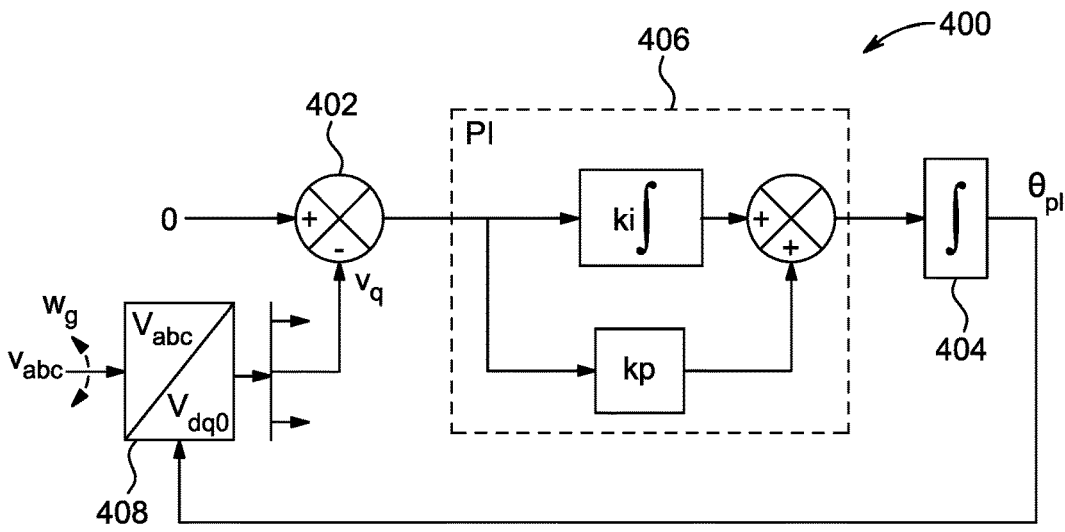

FIG. 4 illustrates a schematic diagram of a PLL, according to certain embodiments.

Figure 5:
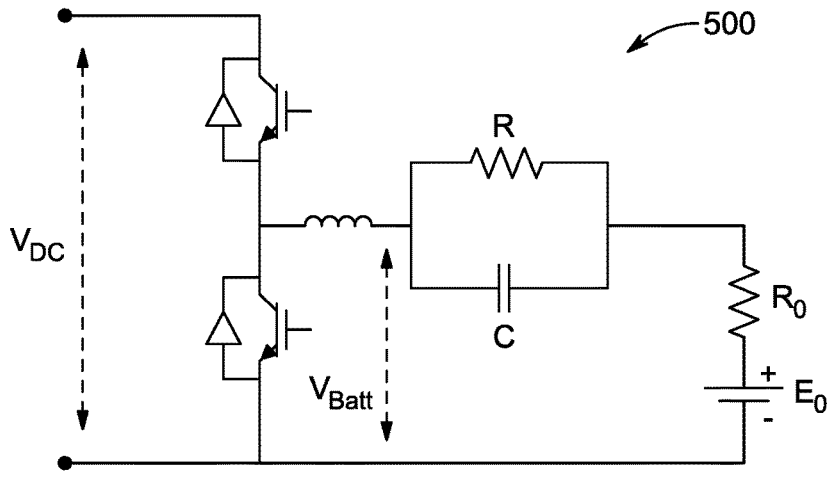

FIG. 5 illustrates a model of a battery coupled with a bidirectional DC-DC converter, according to certain embodiments.

Figure 6:
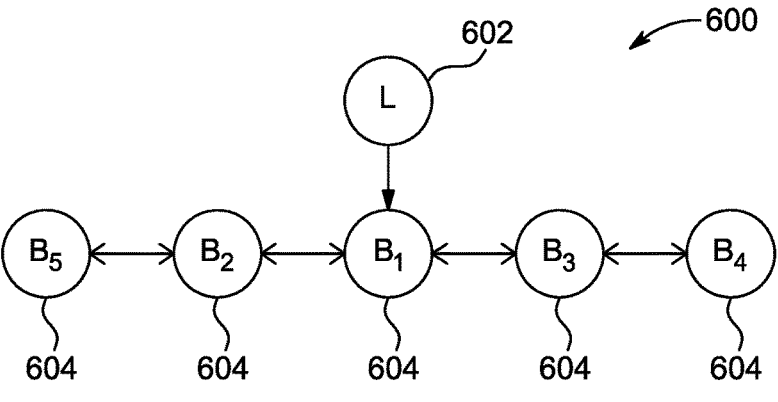

FIG. 6 illustrates a multi-agent system communication topology in a leader and followers approach, according to certain embodiments.

Figure 7:
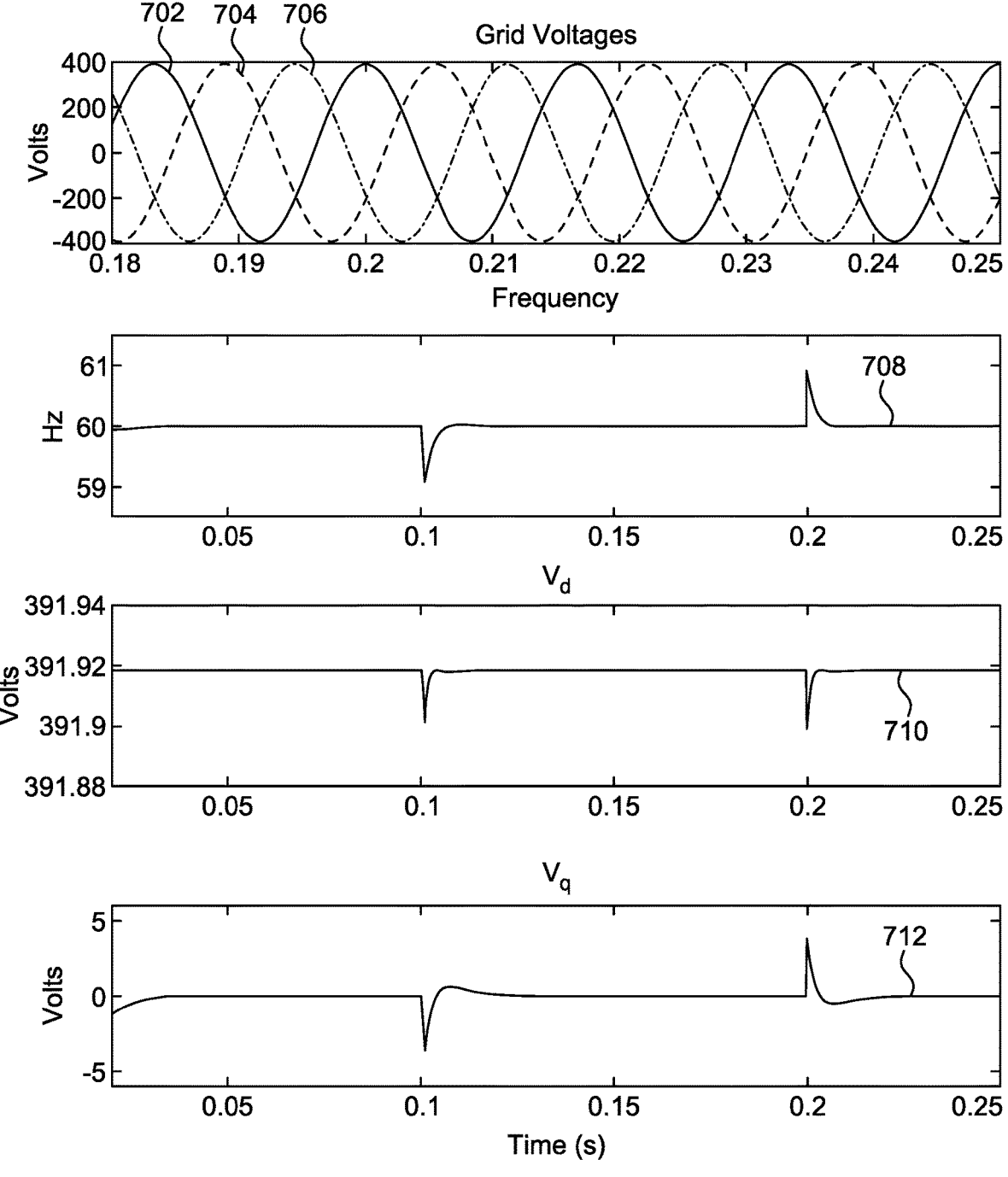

FIG. 7 illustrate graphs representing dynamic performance of a PLL, according to certain embodiment.

Figure 8:
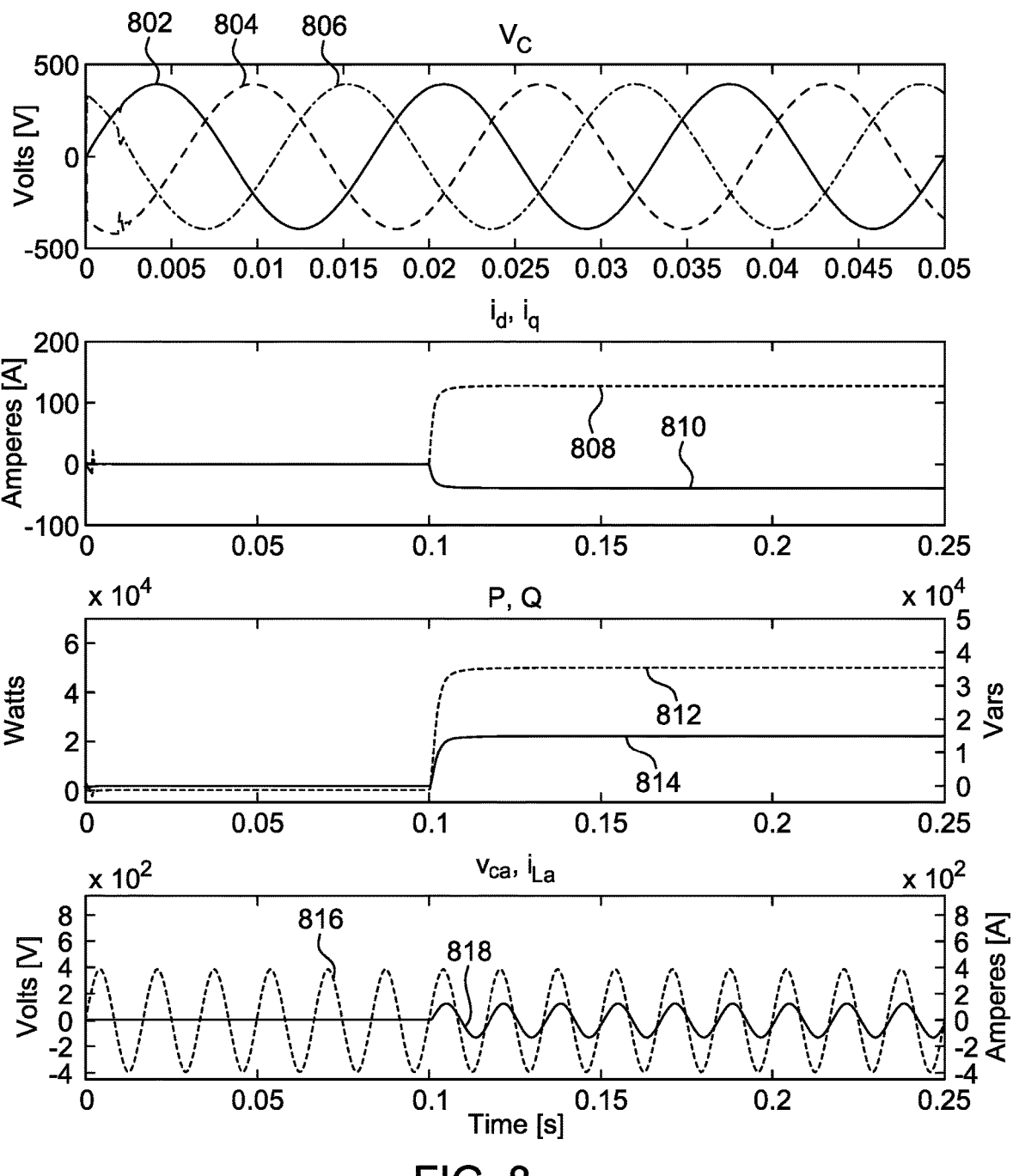

FIG. 8 illustrate graphs representing dynamic performance of a small signal model of an inverter, according to certain embodiments.

Figure 9:
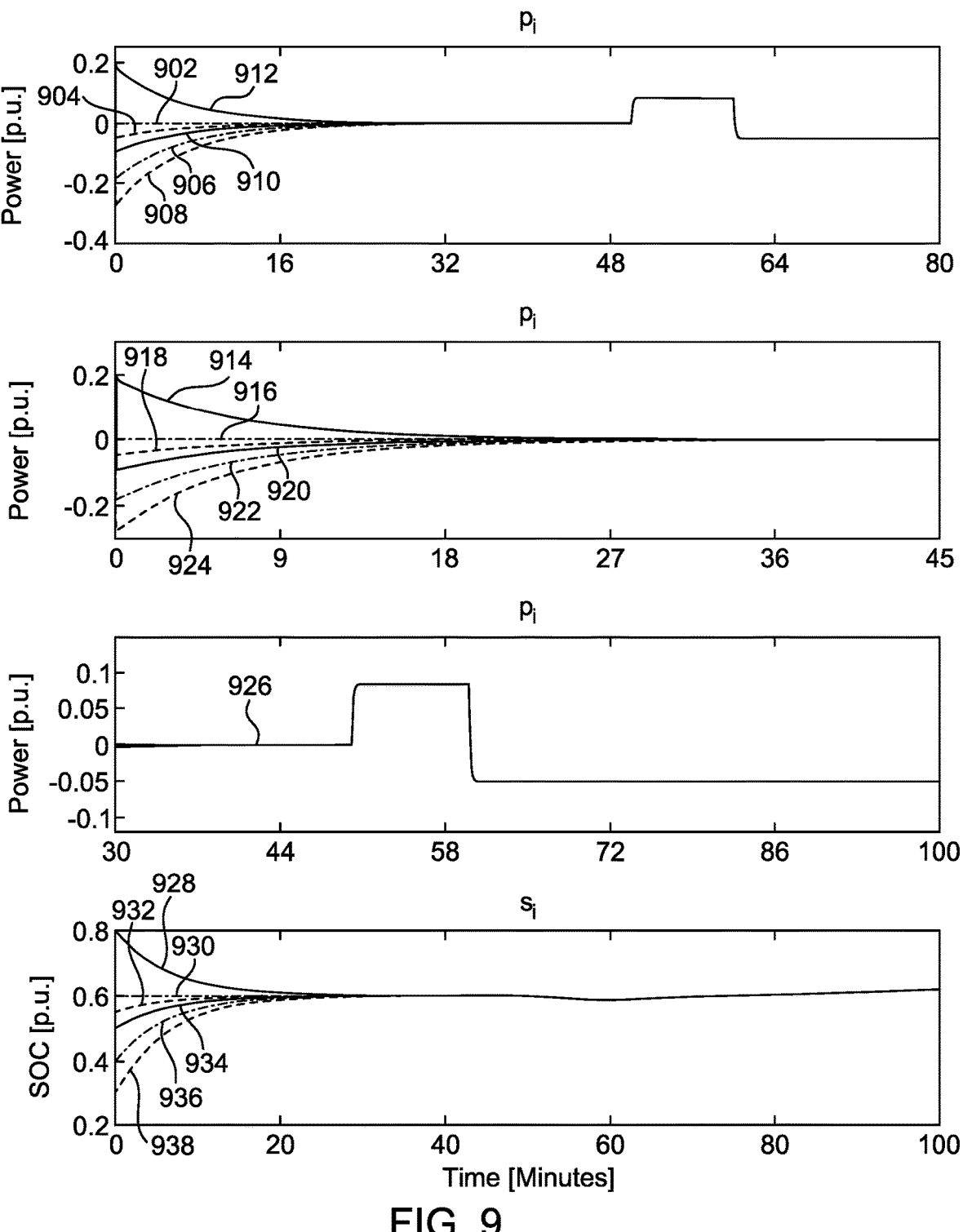

FIG. 9 illustrates graphs representing dynamic analysis of a multi-agent system, according to certain embodiments.

Figure 10:
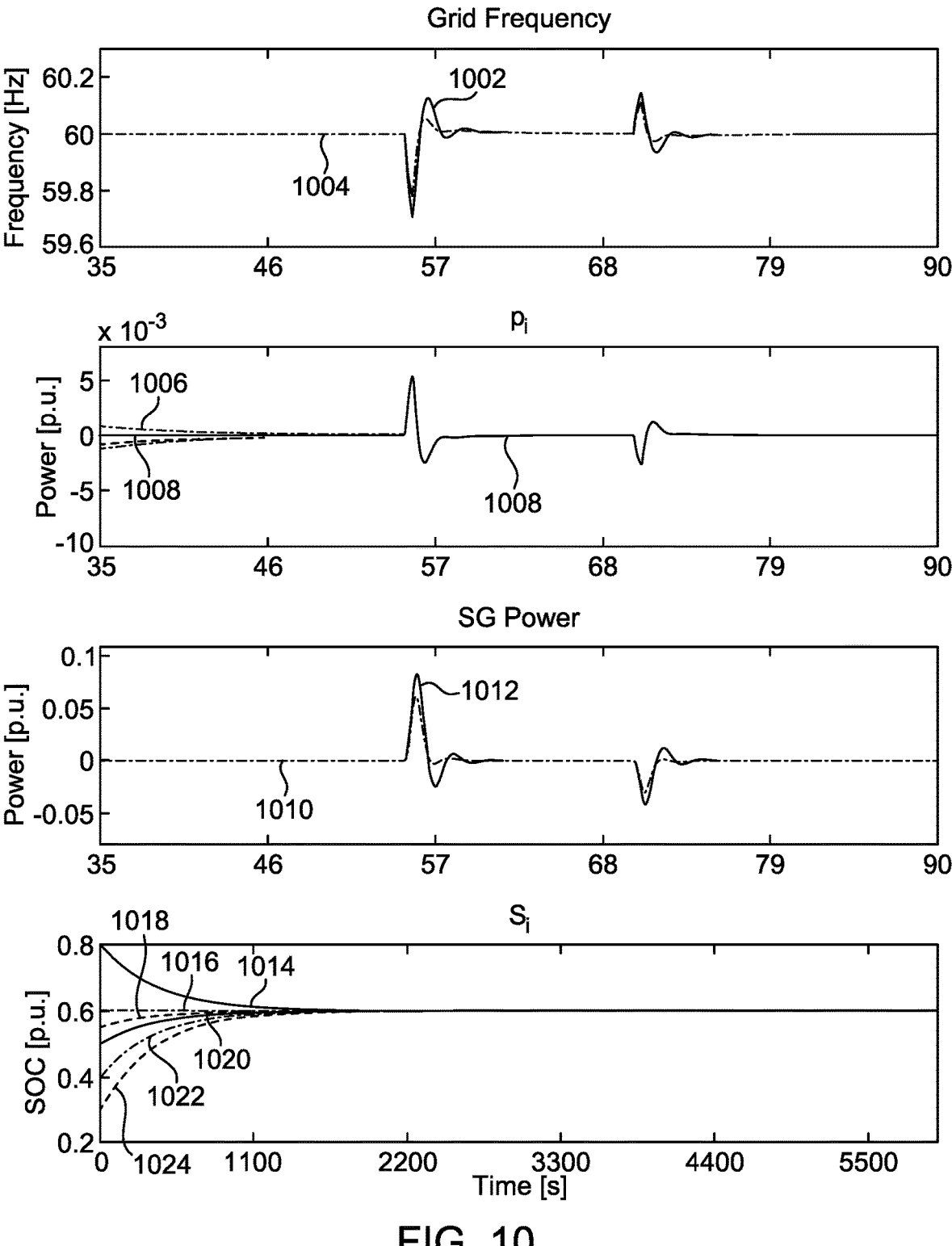

FIG. 10 illustrates a microgrid frequency response under the cooperative consensus-based VSG, according to certain embodiments.

Figure 11:
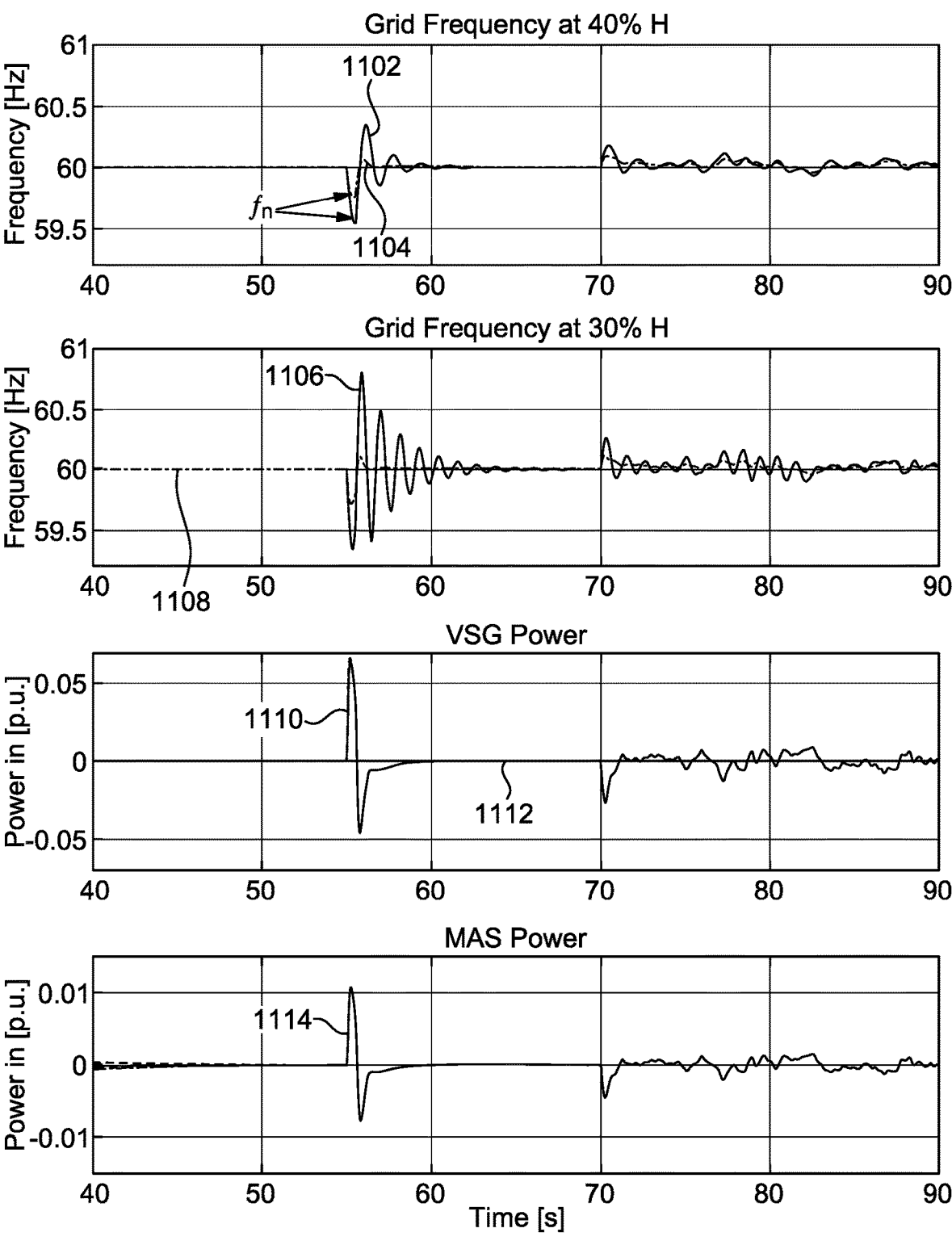

FIG. 11 illustrates a performance of the decentralized virtual synchronous generator (VSG) under highly noisy RES injection, according to certain embodiments.

Figure 12:
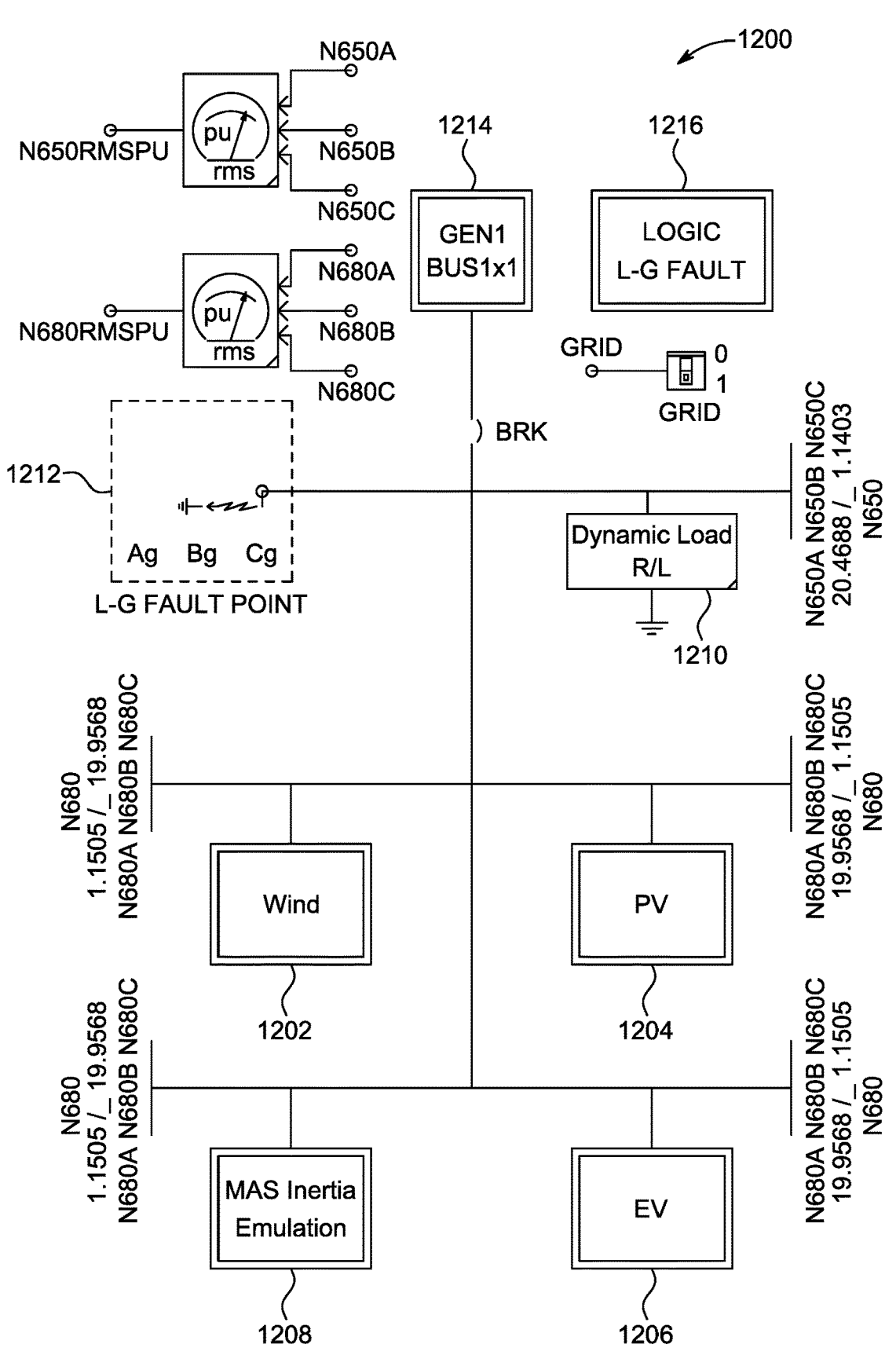

FIG. 12 illustrates a computer model of the microgrid 102 over a real-time digital simulator (RTDS) tool for validation purposes, according to certain embodiments.

Figure 13A:
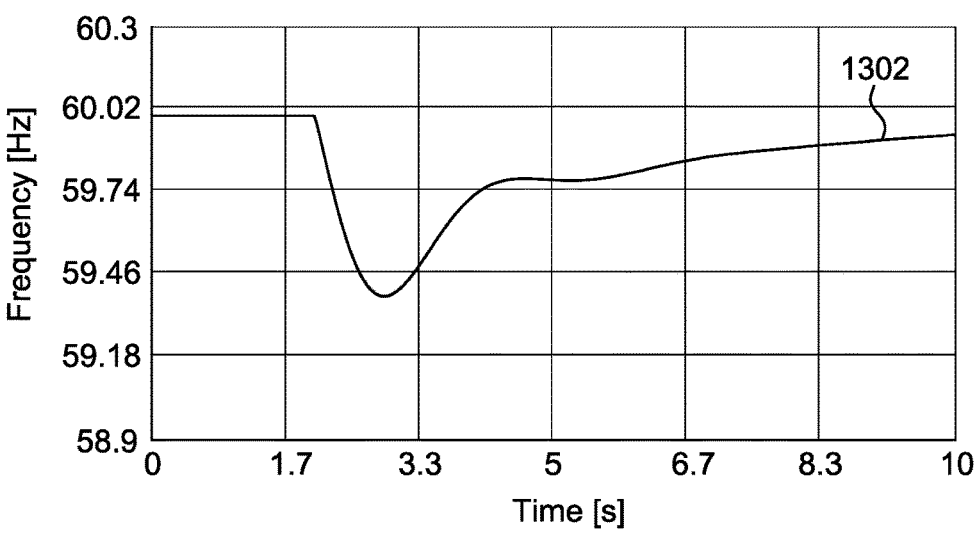
Figure 13A:
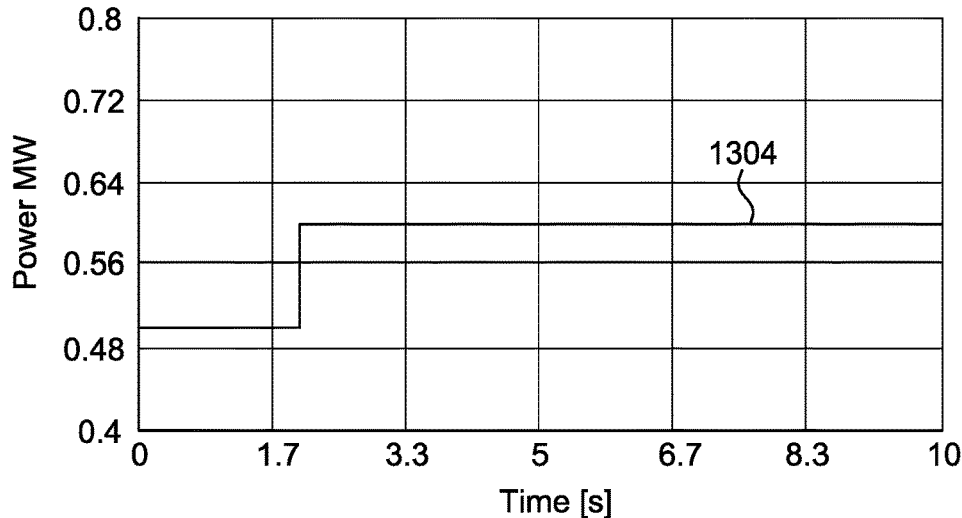
Figure 13A:
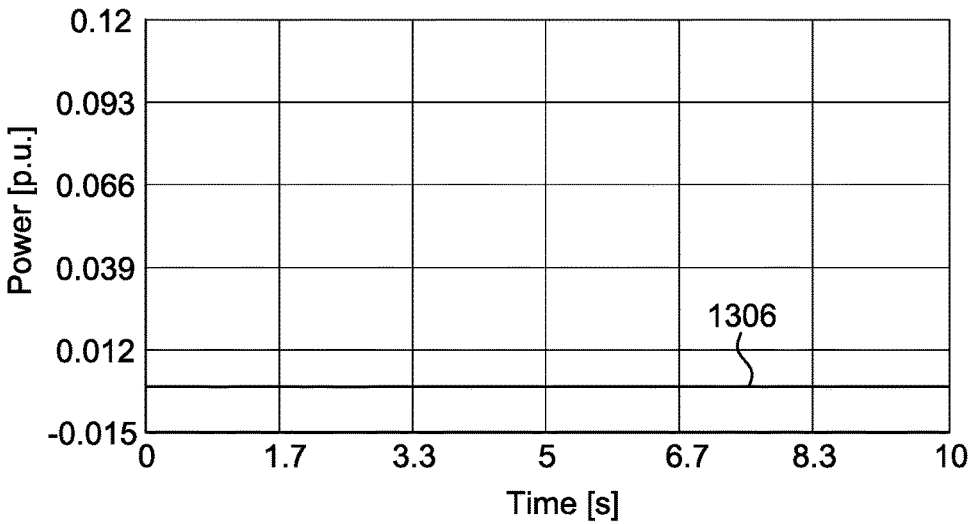
Figure 13A:
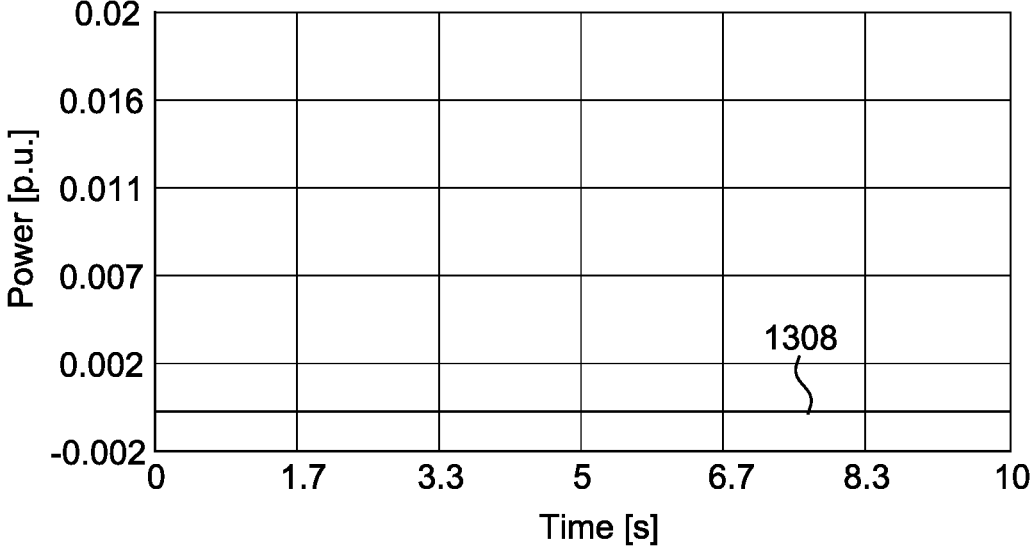
Figure 13A:
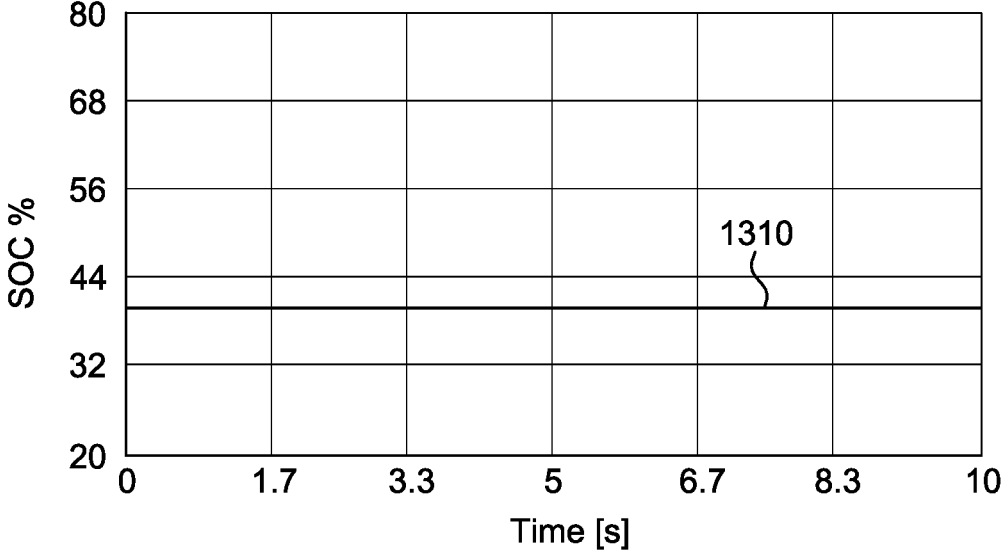

FIG. 13A illustrates a frequency response of the microgrid as a dynamic analysis of the microgrid benchmark in RTDS tool when a virtual synchronous generator is inactive, according to certain embodiments.

Figure 13B:
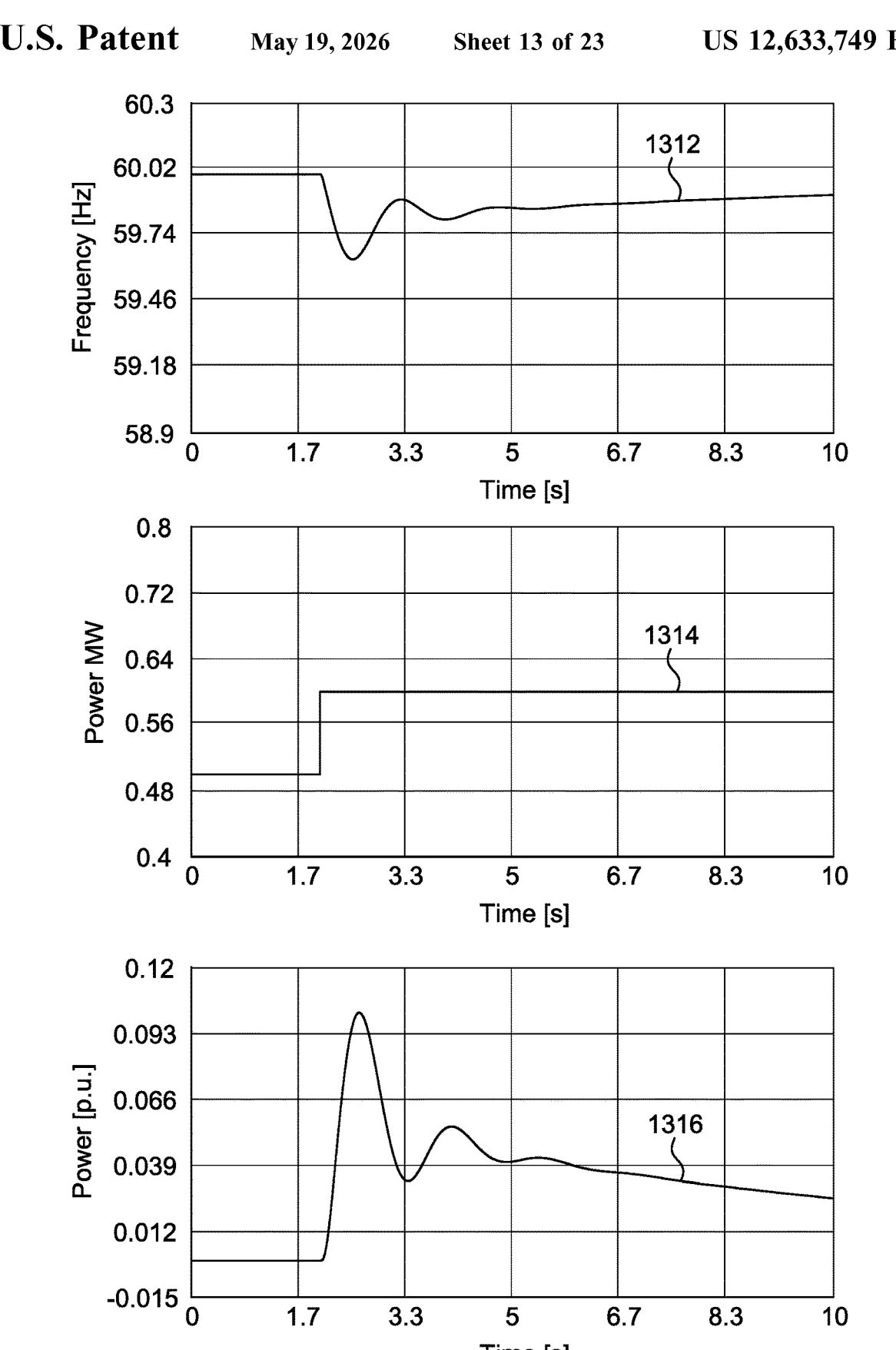
Figure 13B:
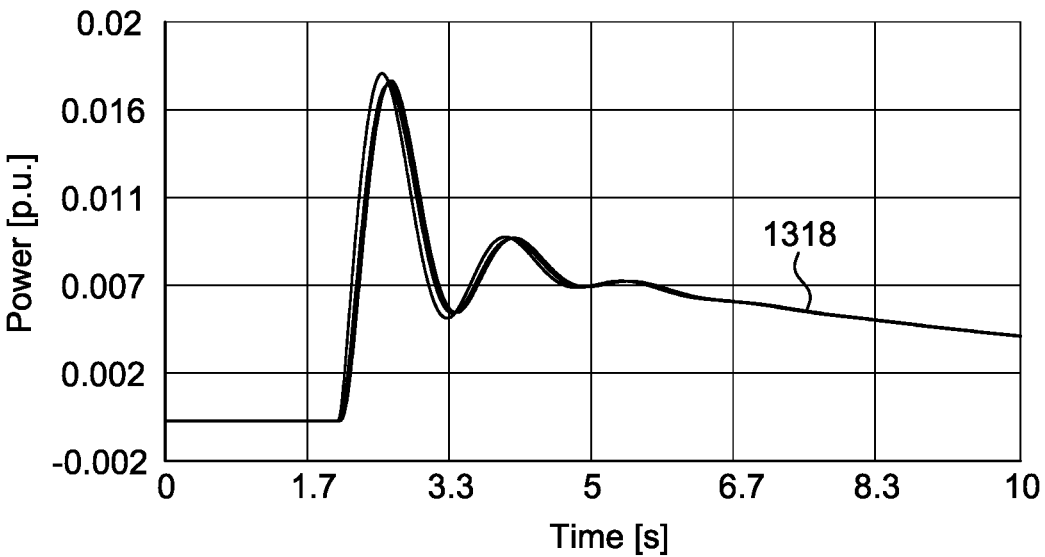
Figure 13B:
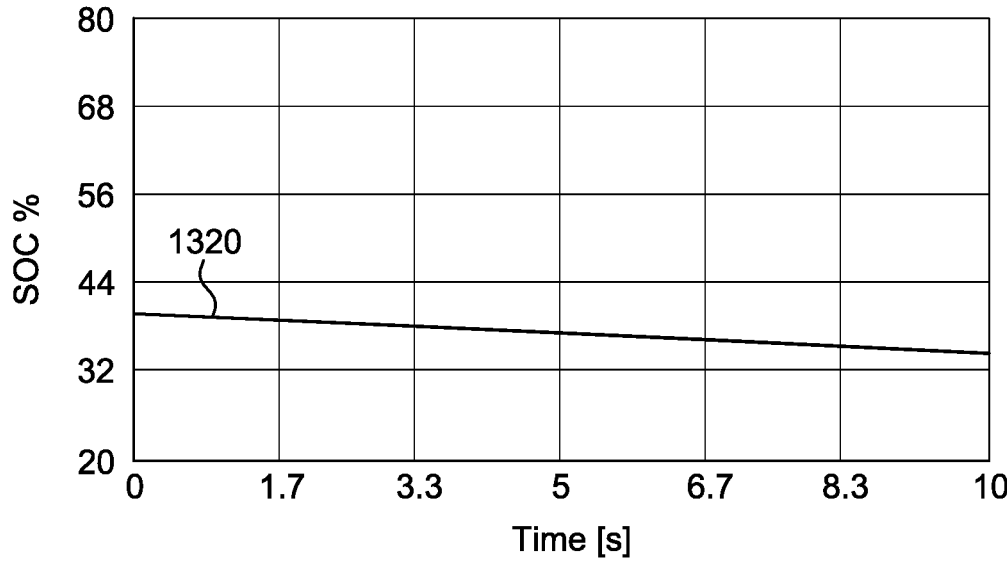

FIG. 13B illustrates a frequency response of a microgrid as a dynamic analysis of the microgrid benchmark in RTDS tool when the virtual synchronous generator is active, according to certain embodiments.

Figure 14:
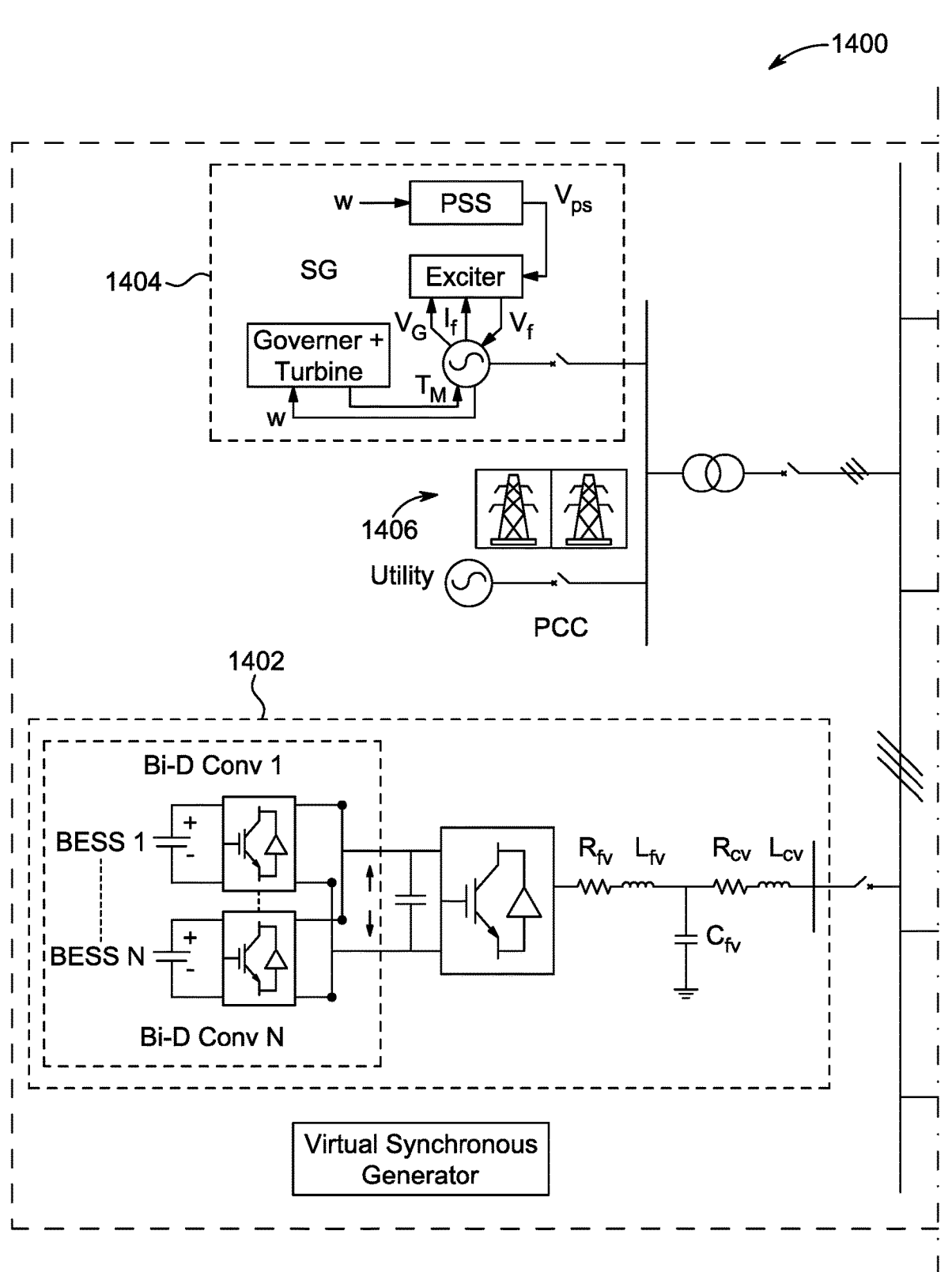
Figure 14:
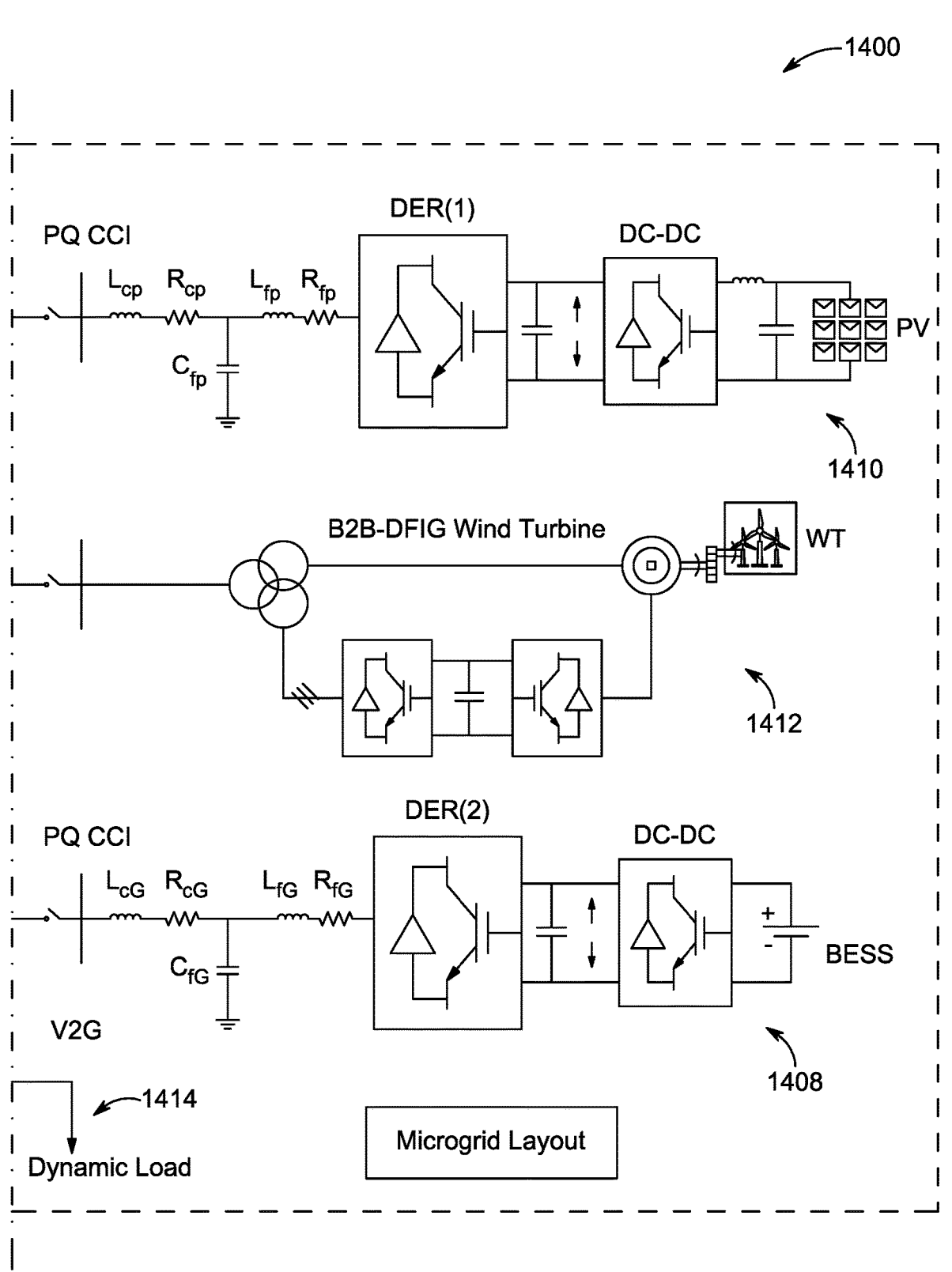

FIG. 14 illustrates a complete layout of a microgrid into RTDS environment, according to certain embodiments.

Figure 15:
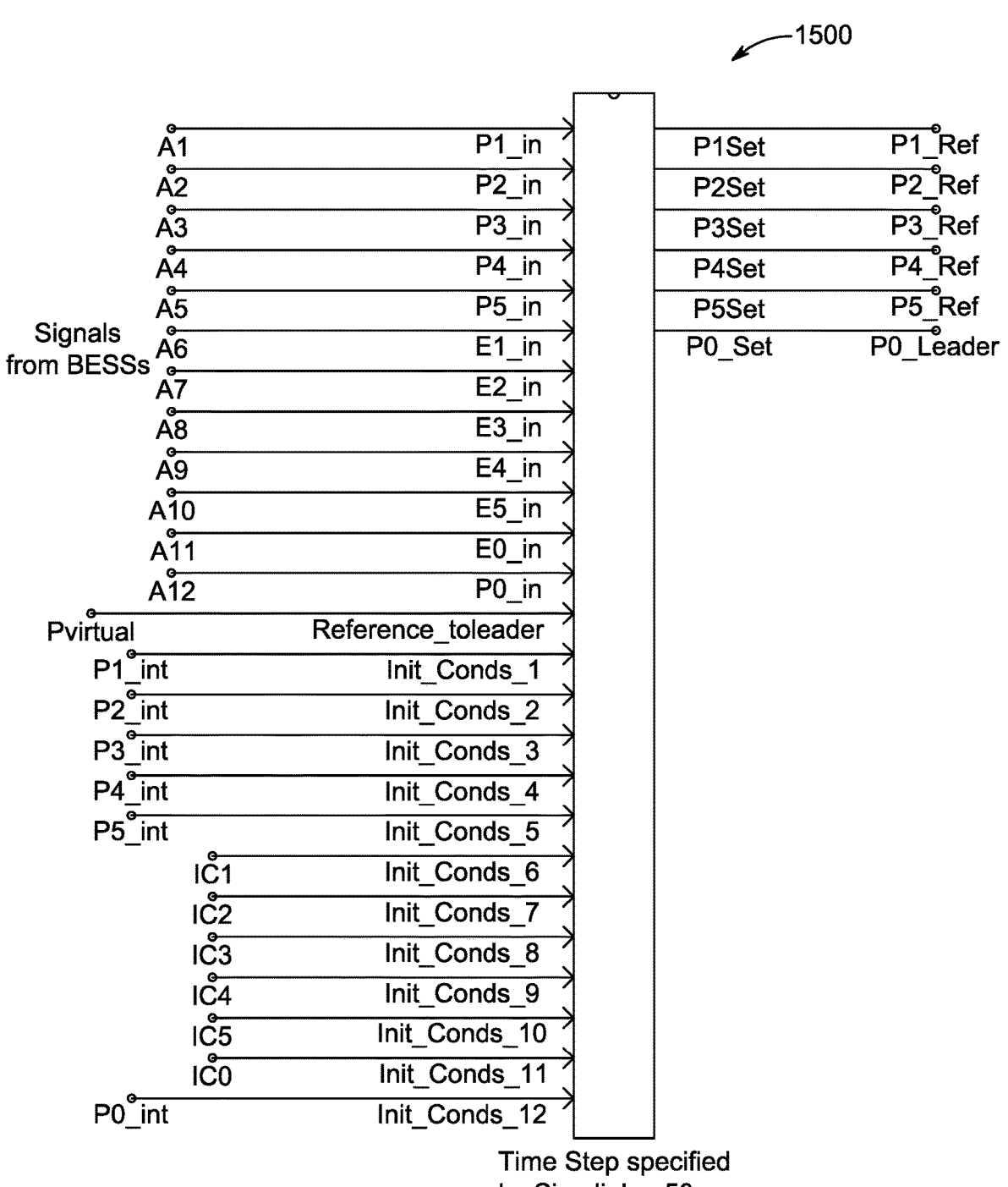

FIG. 15 illustrates a distributed consensus controller into the RTDS environment, according to certain embodiments.

Figure 16:
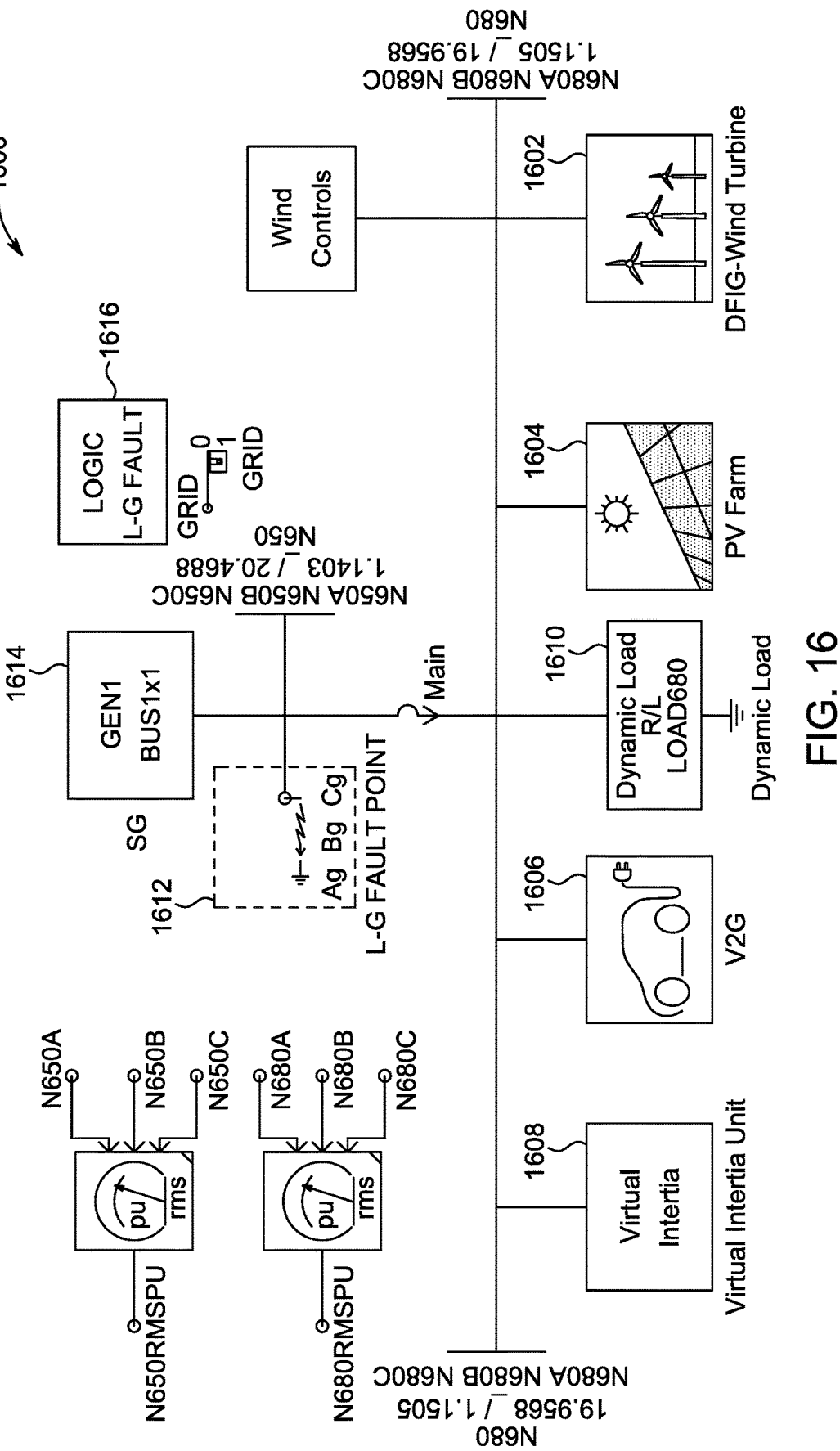

FIG. 16 illustrates another benchmark system for the microgrid in the RTDS environment, according to certain embodiments.

Figure 17:
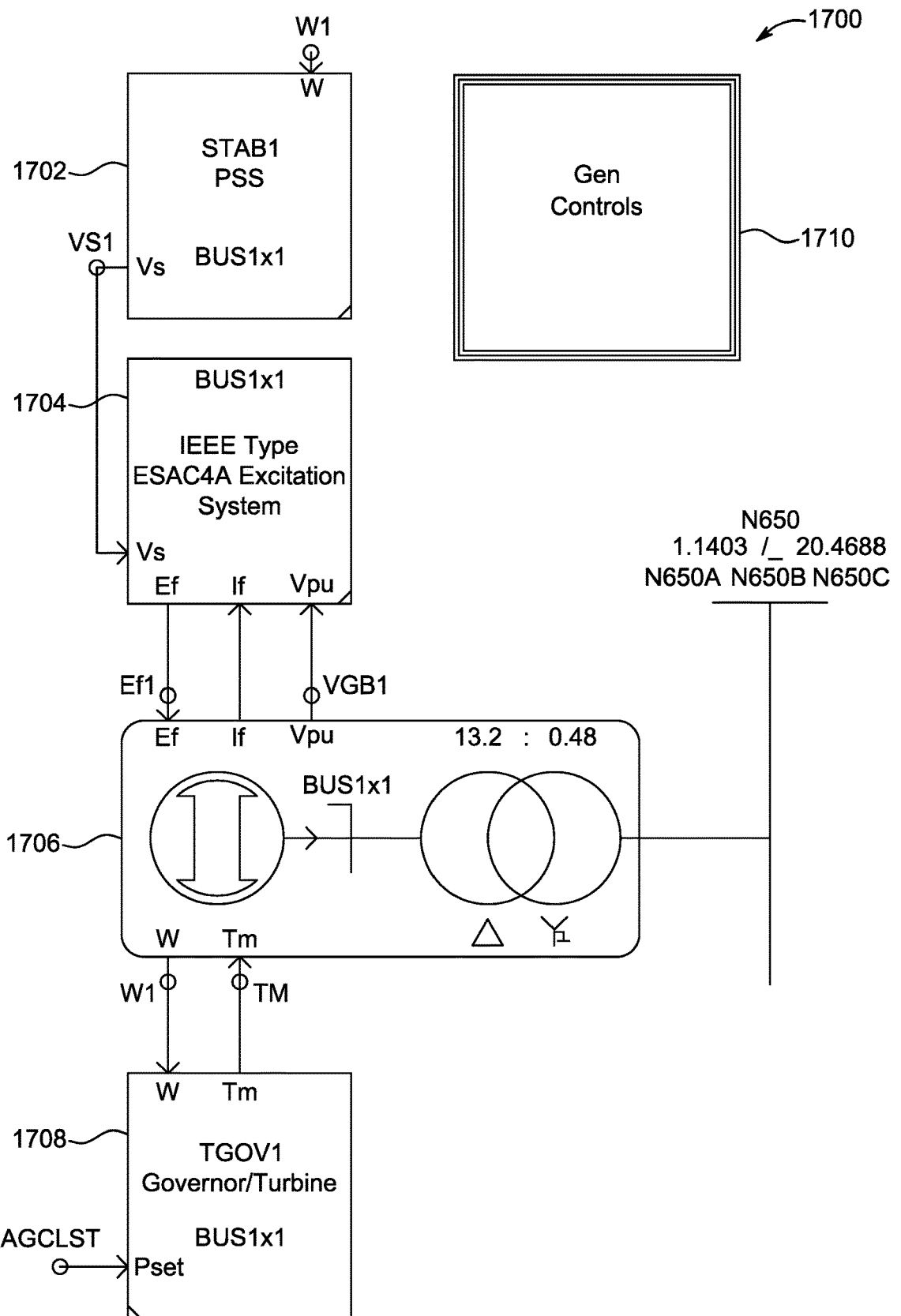

FIG. 17 illustrates a model of the synchronous generator (SG) used in the microgrid in the RTDS environment, according to certain embodiments.

Figure 18:
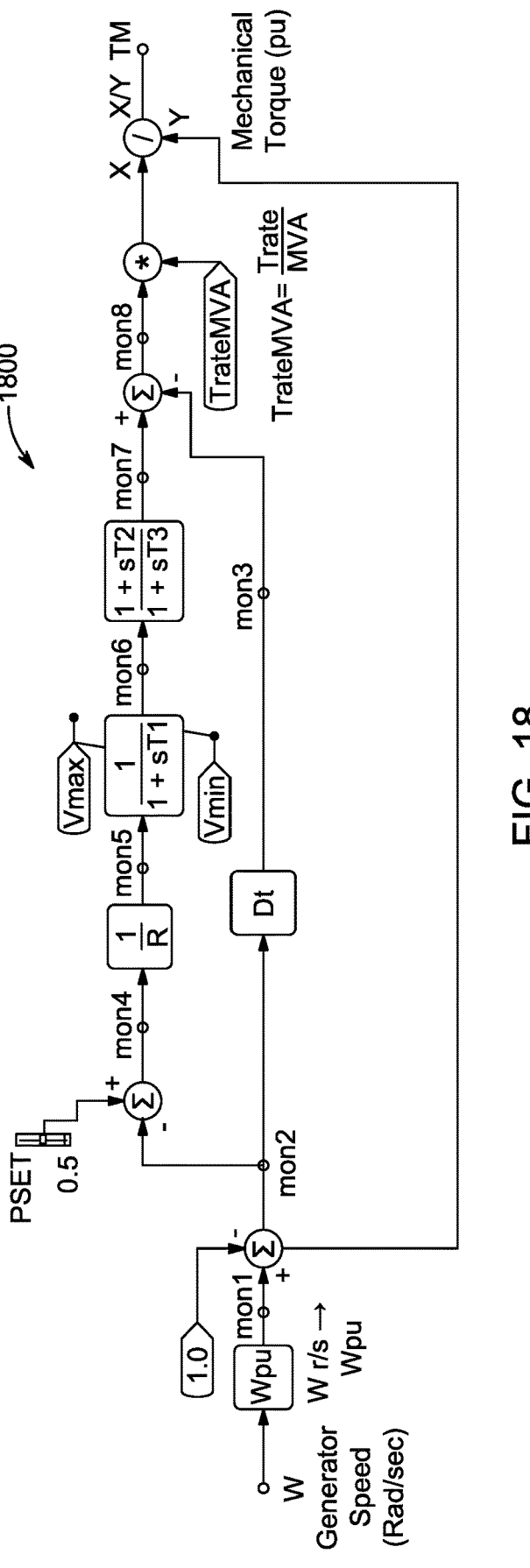

FIG. 18 illustrates a structure of the governor in the RTDS environment, according to certain embodiments.

Figure 19:
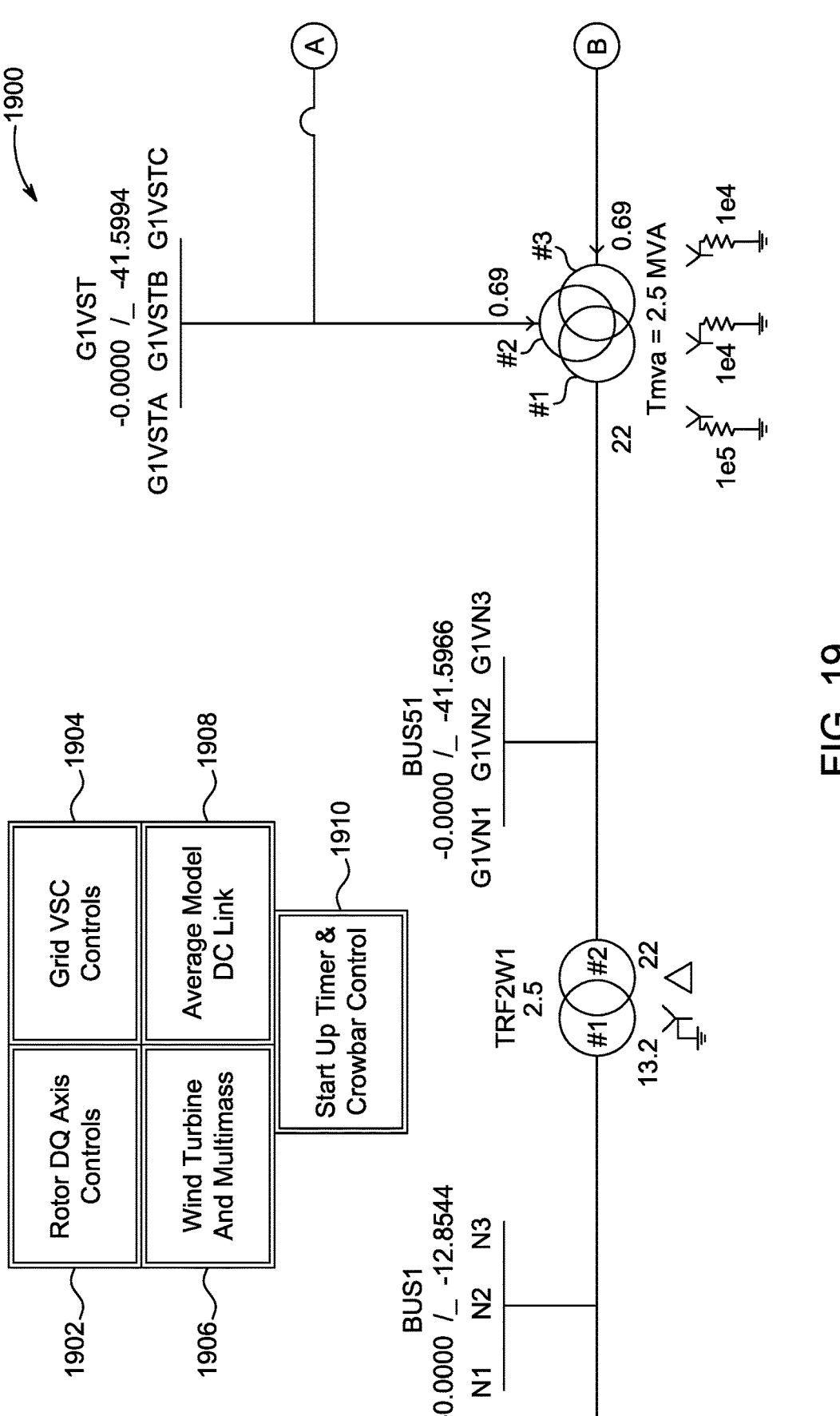
Figure 19:
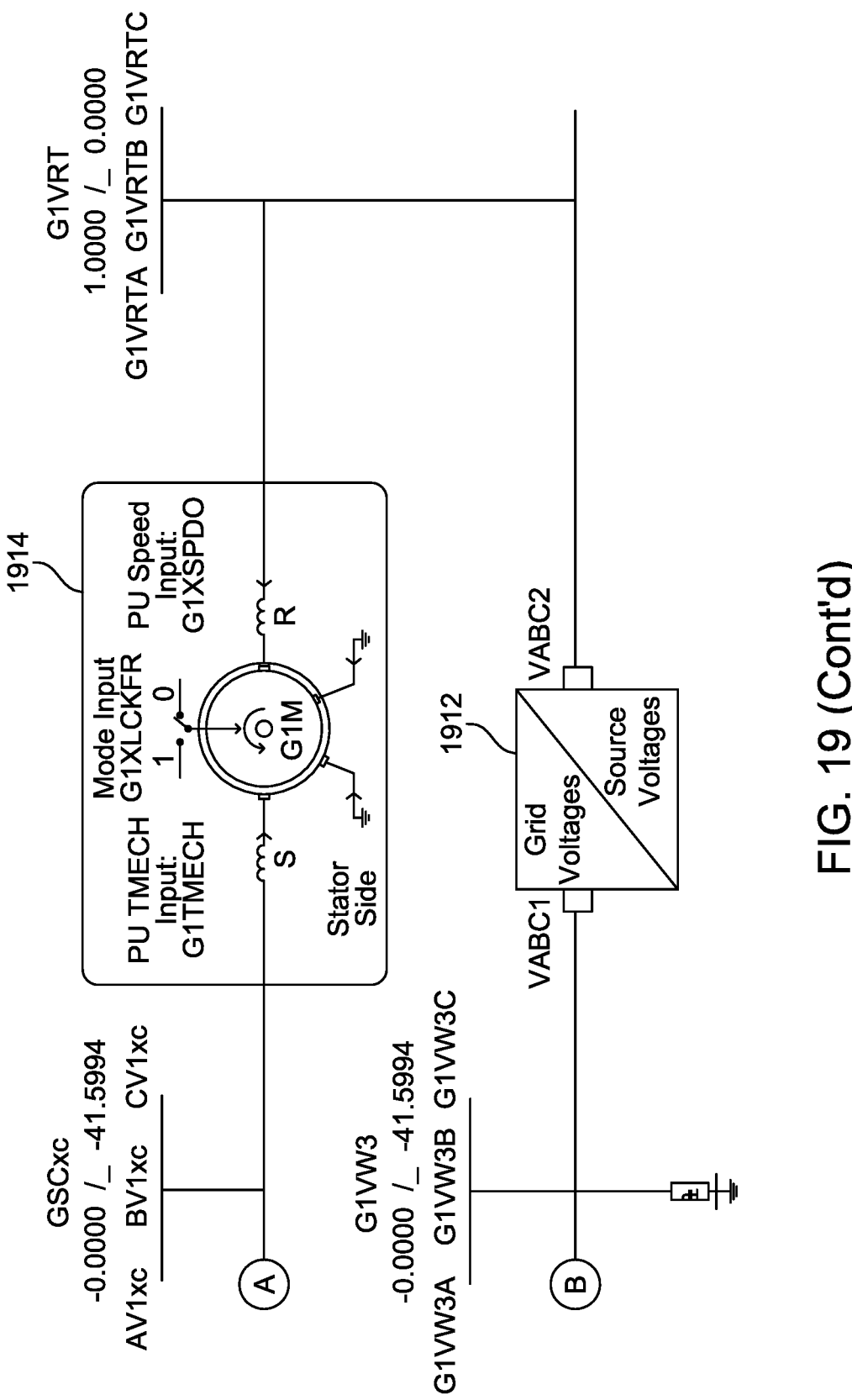

FIG. 19 illustrates structure of a wind turbine based-doubly-fed induction generator (DFIG) in the RTDS environment, according to certain embodiments.

Figure 20:
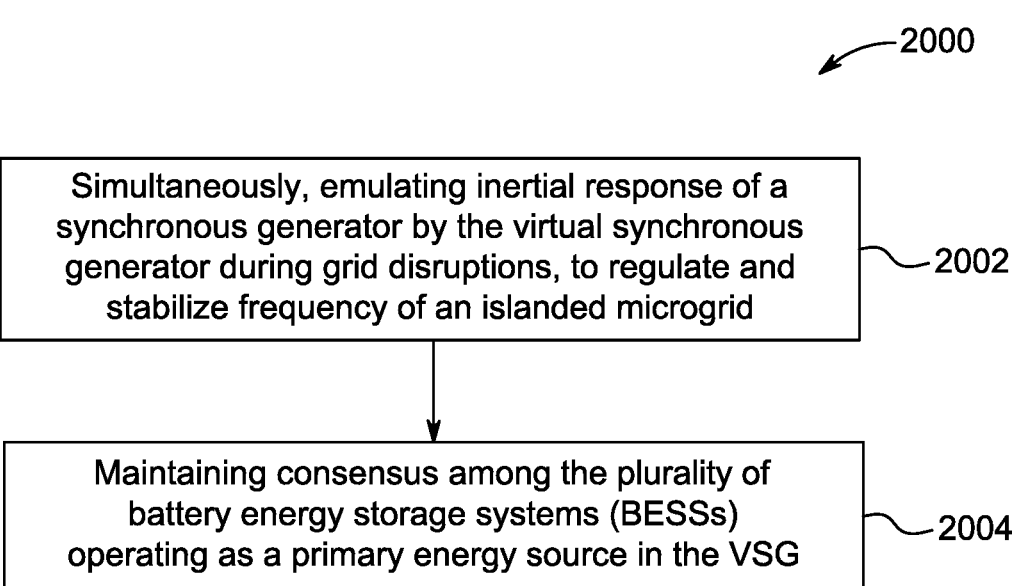

FIG. 20 illustrates a flowchart of a control method for a power distribution system, according to certain embodiments.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Furthermore, the terms "power grid" or "utility grid" or "grid" are used synonymously and interchangeably.

Furthermore, the terms "grid-connected inverter" or "grid-tied inverter" "grid-follower inverter" or "three-phase invertor" or "inverter" are used synonymously and interchangeably.

Aspects of this disclosure are directed to a system, device, and a consensus-based generalized virtual inertia multiagent control method to balance the state of charge (SOC) of microgrid storage systems and regulate the frequency of an islanded microgrid during grid disruptions and thus configured to act as a grid-forming unit. A cooperative controller is configured to perform two tasks simultaneously. The first one includes emulating the inertial response of the synchronous generator, and the second task includes adjusting the output power of operative batteries to balance the SOC while providing inertial support to the microgrid. The consensus-based virtual inertia control scheme is applied to regulate the frequency and control the operating Energy Storage Systems (ESSs) in a distributed fashion so that no battery is depleted when available capacity exists in the remaining ESSs, offering advantages over centralized control strategies in terms of robustness and utilization.

Figure 1:
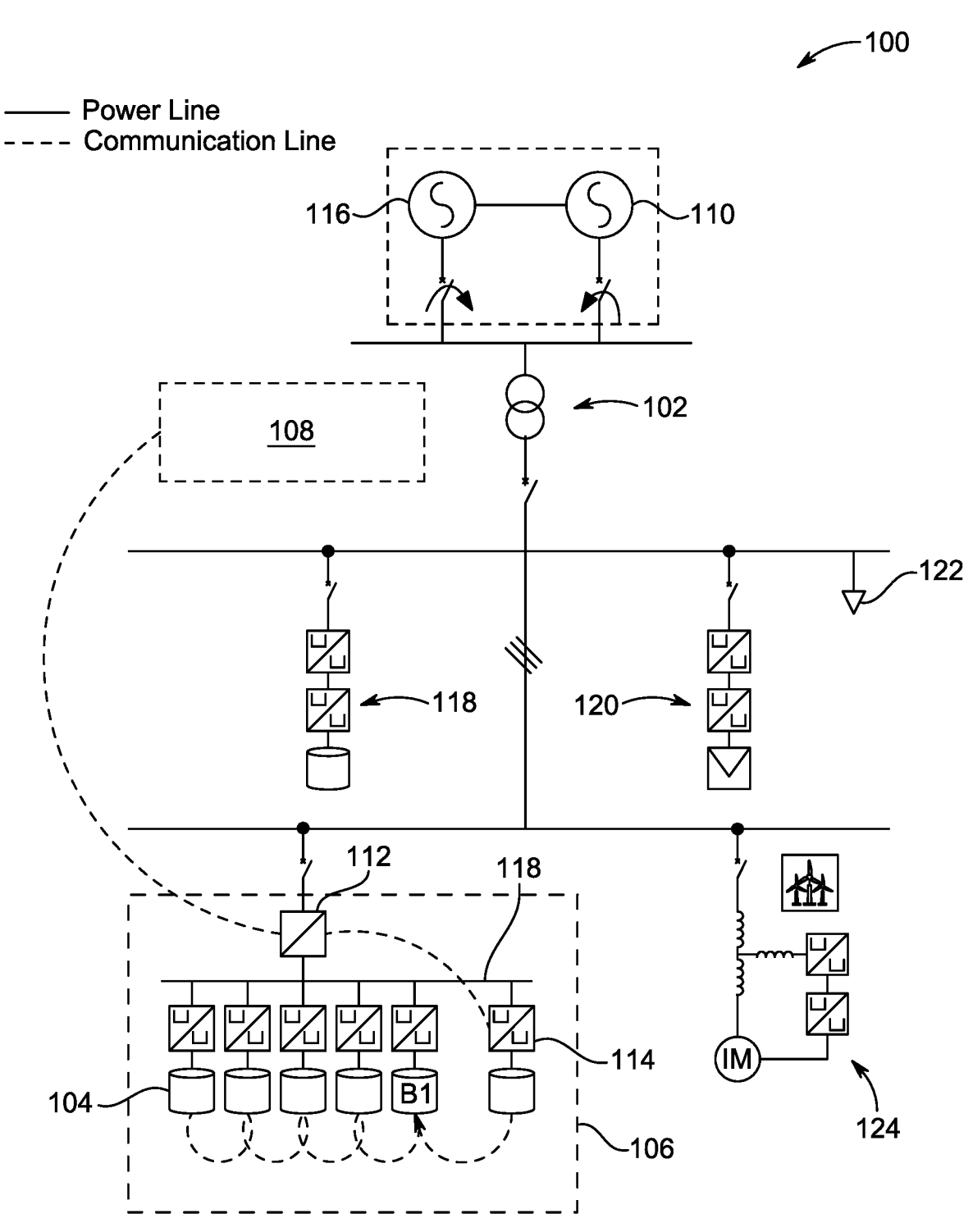
FIG. 1 illustrates a power distribution system, according to certain embodiments.

FIG. 1 illustrates a power distribution system 100, according to an embodiment. The power distribution system 100 includes an islanded smart microgrid or simply an islanded microgrid 102. The islanded microgrid 102 includes a synchronous generator 110, a doubly fed induction generator (not shown), a grid-tied PV system 120, grid-tied electric vehicles charging station 118, and a composite load 122. Further, the islanded microgrid 102 includes a wind farm 124. In an embodiment, the composite load may represent a plurality of loads due to household appliances of one or more houses. In an embodiment, the power distribution system 100 may be connected to a main grid or a utility grid 116.

The islanded microgrid 102 further includes a virtual synchronous generator or VSG 106. The VSG 106 is configured to inject virtual inertia to the grid for stabilization at the time of occurrence of disturbance, such as frequency deviation or the power deviation due to unexpected load. The disturbance may also occur in the microgrid due to the intermittent nature of the atmosphere and the wind pattern. The disturbance may cause frequency fluctuation in the grid or microgrid. To nullify the frequency fluctuation in the grid or microgrid, the VSG 106 generates a virtual inertia and uses it in the grid or microgrid for frequency stabilization. Therefore, the VSG 106 is configured to emulate a real synchronous generator. Further, the VSG 106 is a decentralized consensus-based VSG 106. The VSG 106 comprises a VSG unit that includes a grid-connected inverter 112. The grid-connected inverter 112 is a three-phase inverter configured to convert the DC supply of a group of batteries into an AC signal. In an embodiment, the grid-connected inverter 112 is a three-phase grid-connected inverter 112 and configured to connect the VSG 106 with the utility grid 116.

The VSG unit further includes bidirectional converters 114. For example, the bidirectional converters may be any of or a combination of a boost DC-DC converter, buck-boost DC-DC converter or buck type DC-DC converter. In an embodiment, the bidirectional converter may be a non-isolated type or isolated type converter. The bidirectional converters 114 are attached to all battery modules 104 to have fully-fledged lower-level controls.

The VSG unit further includes a multi-agent BESSs 104. In an embodiment, a group of heterogenous lithium-ion batteries 104 represents the multi-agent system. The multiagent system is attached to a DC-link 118 of the grid-connected inverter 112, such that the VSG unit is integrated into the power grid 116 through the three-phase grid-connected inverter 112. Further, the plurality of battery energy storage systems 104 is controlled by the multi-agent system in the islanded microgrid 102. Accordingly, the islanded microgrid 102 further includes a plurality of battery energy storage systems 104 (BESSs) operating as a primary energy source in the power distribution system 100. In an embodiment, the batteries 104 may be homogenous. The model of the BESS 104 used in the microgrid is now explained with reference to FIG. 5.

FIG. 5 illustrates a model of a battery coupled with a bidirectional DC-DC converter 500, according to an embodiment. Since, the grid connected batteries operate in decentralized microgrids, a bidirectional DC-DC converter is always attached to the battery for full fledge lower-level controls. The dynamics of the aggregated system of the battery can be expressed as:

$$\frac{di_L}{dt} = -\frac{r_o}{L} - \frac{1}{L}v_c + \frac{V_{dc}}{L}d - e_o; \tag{1}$$

$$\frac{dv_c}{dt} = \frac{1}{C_b}i_L - \frac{1}{r_bC_b}v_c; \tag{2}$$

$$\frac{de_o}{dt} = 0, \tag{3}$$

where $i_L$, $v_c$, $V_{dc}$, and $e_o$ denote the bidirectional converter current, capacitor voltage, input voltage, and the internal electromotive force, respectively. The small-signal model of the BESS system 104 or 500 is written as, $$\frac{d}{dt}\begin{bmatrix} i_L \\ v_c \\ e_o \end{bmatrix} = \begin{bmatrix} -\frac{r_o}{L} & -\frac{1}{L} & 1 \\ \frac{1}{C_b} & -\frac{1}{r_bC_b} & 0 \\ 0 & 0 & 0 \end{bmatrix} \begin{bmatrix} i_L \\ v_c \\ e_o \end{bmatrix} + \tag{4}$$

$$\begin{bmatrix} \frac{V_{dc}}{L} \\ 0 \\ 0 \end{bmatrix} d \frac{d}{dt}\begin{bmatrix} i_L \\ v_c \\ e_o \end{bmatrix} = \begin{bmatrix} -\frac{r_o}{L} & -\frac{1}{L} & 1 \\ \frac{1}{C_b} & -\frac{1}{r_bC_b} & 0 \\ 0 & 0 & 0 \end{bmatrix} \begin{bmatrix} i_L \\ v_c \\ e_o \end{bmatrix} + \begin{bmatrix} \frac{V_{dc}}{L} \\ 0 \\ 0 \end{bmatrix} d.$$

And the output can be represented as $$y_B = \begin{bmatrix} 1 & 0 & 0 \\ r_o & 1 & 1 \end{bmatrix} \begin{bmatrix} i_L \\ v_c \\ e_o \end{bmatrix}. \tag{5}$$

Referring back to FIG. 1, the microgrid 102 further includes a control system 108. The control system 108 is configured to control the grid-connected inverter 112, bidirectional converters 114, and the group of BESSs 104 as a decentralized power grid-forming unit at the time of occurrence of disturbance. Accordingly, whenever, an imbalance occurs in the grid, such as a frequency deviation or a power deviation as a grid disruption, the control system 108 is configured to simultaneously emulate inertial response of the attached synchronous generator 110 by the VSG 106, to regulate and stabilize frequency of the islanded microgrid 102, and maintain consensus among the plurality of battery energy storage systems 104. In an embodiment, maintaining consensus includes synchronizing the power and state of charge (SOC) of the plurality of battery energy storage systems 104 of the multi-agent system. The dotted line in FIG. 1 represents a communication line, such that the control system 108 is configured to perform an IOT based communication with the invertor 112 and the bidirectional converter 114. The communication may be wired or wireless. The solid line represents a power line among various components of the microgrid 102. The details of the process of emulation of inertial response of a synchronous generator 110 by the VSG 106 during grid disruptions for regulating and stabilizing the frequency of the islanded microgrid 102, and maintaining the consensus among the BESSs 104 is now described with reference to FIG. 2-FIG. 6.

FIG. 2 illustrates a microgrid layout 200 in detail, according to an embodiment. The microgrid 200 and 102 in FIG. 1 represents the same microgrid. The microgrid 200 includes a rate of change of frequency (ROCOF) control loop or also known as virtual inertia control loop 202 and a current controller block 204. Both systems may be an integral part of the control system 108, as described in FIG. 1. In an embodiment, the ROCOF loop 202 may not be part of the control system 108 and act as a separate system, such as a server, where the control system 108 may communicate with the ROCOF loop 202 for performing the computation at the time of frequency fluctuation in the grid. The ROCOF control loop 202 is configured to compute and generate necessary inertial power signal required to be injected into the grid 100 at the time of frequency disturbance or fluctuation. In order to detect the fluctuation in frequency, a PLL (shown in FIG. 4) is coupled with the grid. Attaching the PLL's dynamics to the grid-connected converters' overall model is fundamental for synchronization. In an embodiment, the PLL may be an integral part of the ROCOF loop 202. The dynamics of the PLL is elaborated in detail in FIG. 4.

FIG. 4 illustrates a schematic diagram of a PLL 400, according to an embodiment. The PLL includes an adder 402, a PI controller 406, an integrator 404, and a feedback block 408. The voltage or current or a power signal received from the grid is fed back to the PLL 400 to detect the frequency deviation. The small signal model of the PLL 400 can be provided in state space form as below:

$$\dot{x}_2 = \begin{bmatrix} 0 & K_I^{PLL} \\ 0 & 0 \end{bmatrix} \begin{bmatrix} \theta_{PLL} \\ \Phi_{PLL} \end{bmatrix} + \begin{bmatrix} K_P^{PLL}v_{oq} \\ v_{oq} \end{bmatrix}, \tag{6}$$

$$\text{where } x_2 = [\theta_{PLL}\Phi_{PLL}]^T \tag{7}$$

and the output is given by, $$y = [\theta_{PLL} \quad v_{od} \quad v_{oq}]^T, \tag{8}$$

Further, the overall small-signal model of the grid-follower inverter 112 in the compact form is composed as, $$\dot{x} = A_{pq}x + B_{pq}u \tag{9}$$

$$y = Cx$$

where x and $A_{pq}$ are written as, $$x = [\theta_{PLL} \quad \Phi_{PLL} \quad \gamma_d \quad \gamma_q \quad i_{Ld} \quad i_{Lq} \quad v_{cd} \quad v_{cq} \quad i_{od} \quad i_{oq}]^T \qquad (10)$$

$$A_{pq} = \begin{bmatrix} A_{PLL}^{2\times2} & 0^{2\times2} & 0^{2\times6} \\ 0^{2\times2} & A_{C\_Controller}^{2\times2} & 0^{2\times6} \\ 0^{6\times2} & 0^{6\times2} & A_f^{6\times6} \end{bmatrix} \qquad (11)$$

Without loss of generality, the input to the PO inverter can be in the form of.

$$u = [P_{ref}^* \quad Q_{ref}^* \quad v_{od} \quad v_{oq}]^T \qquad (12)$$

Based upon above model and the used equations, the PLL 400 may generate one or more outputs, such as, the rate of frequency change (d$\omega$/dt), phase value ($\theta$) change in frequency $\Delta\omega$ (=2$\pi\Delta$f) of the grid using the grid terminal voltage Vg.

Referring back to FIG. 2, once the PLL 400 generates the multiple outputs, the generated outputs, for example $\Delta\omega$ or $\Delta$f (i.e. $\Delta\omega$=2$\pi\Delta$f) is fed to the ROCOF loop 202. The ROCOF loop 202 having program instructions for computing the required inertial power ($\Delta$ P$_{VSG}$) to be injected to the grid to regulate the frequency. In an embodiment, the program instructions may include mathematical formula stored in a memory (not shown) of the control system 108 for computing the required inertial power ($\Delta$ P$_{VSG}$) to regulate the frequency. The mathematical formula is defined as below:

$$\Delta P_{VSG,i} = K_1 J_i \frac{d\Delta\omega}{dt} + K_P \Delta\omega; \qquad (13)$$

where, $\Delta$w and $\Delta$ P$_{VSGi}$ are the speed deviation and virtual power, respectively. K$_1$, J$_i$, and K$_p$ denote the virtual parameters of the ROCOF loop 202. In an embodiment, the parameters may also be computed as function of the virtual droop characteristics.

Once $\Delta$ P$_{VSGi}$ is computed, this value is fed to a cascaded current controller block 204 in the control system 108 to generate the d-axis current for controlling a PWM based current controller 206. The current controller block 204 has program instructions for computing the required d-axis current. In an embodiment, the program instructions may again include mathematical formula stored in a memory (not shown) of the control system 108 for computing the d-axis current required to regulate the frequency.

The model of the current controller block 204 is now described in detail.

The control system of the PQ inverter basically relies on the current controller block 204 for tracking purposes. The dynamics of the current controller block 204 is be described by, $$\dot{\gamma}_d = i_{Ld}^* - i_{Ld} \qquad (14)$$

$$\dot{\gamma}_q = i_{Lq}^* - i_{Lq}$$

The inverter voltage in the dq rotating frame is given as, $$v_{invd} = -\omega L_f i_{Lq} + k_{pc}(i_{Ld}^* - i_{Ld}) + k_{ic}\gamma_d \qquad (15)$$

$$v_{invq} = \omega L_f i_{Ld} + k_{pc}(i_{Lq}^* - i_{Lq}) + k_{ic}\gamma_q$$

The small-signal model of the current controller is given by, $$\begin{bmatrix} \dot{\gamma}_d \\ \dot{\gamma}_q \end{bmatrix} = \begin{bmatrix} 0 & 0 \\ 0 & 0 \end{bmatrix} \begin{bmatrix} \gamma_d \\ \gamma_q \end{bmatrix} + \begin{bmatrix} 1 & 0 & -1 & 0 \\ 0 & 1 & 0 & -1 \end{bmatrix} \begin{bmatrix} i_{Ld}^* \\ i_{Lq}^* \\ i_{Ld} \\ i_{Lq} \end{bmatrix} \qquad (16)$$

Similarly, composing v$_{inv}$, in the compact form yields, $$\begin{bmatrix} v_{invd} \\ v_{invq} \end{bmatrix} = \begin{bmatrix} k_{ic} & 0 \\ 0 & k_{ic} \end{bmatrix} \begin{bmatrix} \gamma_d \\ \gamma_q \end{bmatrix} + \begin{bmatrix} k_{pc} & 0 & -k_{pc} & -\omega L_f \\ 0 & k_{pc} & \omega L_f & -k_{pc} \end{bmatrix} \begin{bmatrix} i_{Ld}^* \\ i_{Lq}^* \\ i_{Ld} \\ i_{Lq} \end{bmatrix} \qquad (17)$$

$$i_d^* = \frac{2}{3}\left( \frac{V_d P_{VSG} - V_q Q}{V_d^2 + V_q^2} \right)$$

Based upon the above plurality of equations, the derived mathematical formula for d-axis current is defined as below:

$$i_d^* = \frac{2}{3}\left( \frac{V_d P_{VSG} - V_q Q}{V_d^2 + V_q^2} \right) \qquad (18)$$

The current controller block 204 thus computes the necessary d-axis reference current and supplies to the PWM based current controller 206 which control the PWM signal of the grid tied invertor 210. Here, BESS is shown by a connected battery 208. Accordingly, the VSG 106 regulates the frequency of the islanded microgrid 102 through the rate of change of frequency (ROCOF) control loop 202 by computing the required inertial power ($\Delta$ PVSG) and using the inertial power to derive the necessary current i$_d$*. The value of i$_d$* and its corresponding PWM value thus injects a necessary virtual inertia in the microgrid 102. This communication between the control system 108 and the invertor 112 for injecting the necessary inertia in the microgrid 102 is shown as dotted line in FIG. 1. As such, by injecting the necessary current i$_d$*, the inertial response of the synchronous generator 110 is emulated by the VSG 106 during grid disruptions and frequency of the islanded microgrid 102 is stabilized.

At the same time, the control system 108 is simultaneously configured to maintain consensus among the group of battery energy storage systems 104. Maintaining consensus among the BESS 104 is now described as below with reference to FIG. 3.

FIG. 3 again illustrates a general layout of the microgrid 300 with ROCOF loop 302 and a current controller, according to an embodiment. The microgrid 300 is assumed to be representative of microgrid 102 and 200 in FIGS. 1 and 2, respectively. The microgrid 300 includes a VSG 304 that is representative of VSG 106 in FIG. 1, a three-phase invertor 306 that is representative of invertor 112 in FIG. 1 and connected with the VSG 304, an LCL filter 328, a dual abc/dq block 310 and 314, respectively, a PWM block 322, a PQ control block 316, a dual a PI controller block 318, a dual amplifier block 320 and a phase lock loop 312 connected with the utility grid block 324. The combination of dual block 310, 314, dual PI controller 318 and dual amplifier block are a representative implementation of the ROCOF control loop 202 in FIG. 2 whereas combination of abc/dq block 310 and PWM block 322 are collectively representative of current controller block 204 and the PWM based current controller 206, respectively, for controlling the VSI 210 in FIG. 2 or VSI 306 in FIG. 3. Other components are remaining microgrid topologies 326 that may include PV block 120, V-G block and wind speed controller 124 an in FIG. 1, and the utility grid block 324 as utility grid 116 in FIG. 1.

The multi agent system includes a local consensus controller 308 connected with a group of BESS 104, that is shown as batteries of the VSG 304, for controlling and implementing a consensus law to equalize the power and SOC of a plurality of batteries 104 in the multi agent system at the time of frequency stabilization during grid disruptions. The consensus controller 308 is configured to dynamically balances the SOC of the operative BESS 104. The local consensus controller 308 may have a memory and control instructions configured to implement the consensus law.

Consensus SoC and power level is desirable among energy storage systems since such condition maintains high efficiency and state of health (SoH). With power and energy consensus, no single energy storage tends to go outside the allowed limit during the operating mode change. Therefore, the power capacity of the energy storage is maximized during the operation. When the $\Delta P_{VSG}$ is generated, it is fed to the PWM system to behave as virtual synchronous generator that generates the virtual inertia. Further, since the generated output power or the AC power from the VSI 306 corresponding to $\Delta P_{VSG}$ is being generated from the output of the 3-phase inventor 306, the power relation at input and output terminals from the 3-phase inventor 306 must satisfy the input and output relation as below:

$$P_{ac} = P_{dc} + P_{loss} \tag{19}$$

where, $P_{ac}$ and $P_{dc}$ are the average powers on the AC side and the DC side of the VSI 306, respectively. Here, the DC side and AC side denote the input side and the output side, respectively, of the VSI 306, and $P_{loss}$ denotes the losses through the VSI 306 at the time of converting the DC signal into AC signal, and is usually less than 2% and thus is ignored. As such, the control system 108 is configured to compute the power relation as equation 19 at the time of frequency fluctuation by communicating with the VSI 306 through the communication line.

The control system 108 is further configured to compute the power value at DC side or input side of the VSI 112 or 306 as below:

$$P_{dc}^{Set} \cong V_{dc}I_{dc} \cong v_{ia}i_{sa} + v_{ib}i_{sb} + v_{ic}i_{sc} \tag{20}$$

$$P_{dc}^{Set} \cong V_{dc}I_{dc} \cong v_{ia}i_{sa} + v_{ib}i_{sb} + v_{ic}i_{sc}$$

Since, the VSI 112 or 306 is controlled to operate at a unity power factor (i.e., $v_q \#=0$), the active power of the VSI 112 or 306 at the input side can be written as:

$$P_{dc}^{Set} \cong V_{dc}I_{dc} = v_d i_d \tag{21}$$

Now this power $P_{DC}^{set}$ is used as a global signal. Once the global signal is generated, the control system 108 is configured to communicate the global signal $P_{DC}^{set}$ to the local consensus controller 308 as well as a leader. The leader indicates any one of the batteries and its connected DC-DC converter. The power value $P_{DC}^{set}$ indicates the power required from the BESS 104 of the leader at the input side of the invertor at the time of controlling the frequency fluctuation. The details of the leader and follower approach is now described regarding FIG. 6.

FIG. 6 illustrates a multi-agent system communication topology in a leader and followers approach, according to an embodiment. A node L 602 denotes the leader and a node Bi 604 denotes the ith follower (i.e., BESS). Each follower is able to communicate with its adjacent left or right neighbor only. In an embodiment, the leader is one of the BESS 104 and followers are the remaining BESS 104. In a decentralized controlling system, any one BESS may be randomly chosen as a leader, and the remaining as a follower. The local consensus controller 308 is configured to apply mathematical equations to solve the consensus problem in a double-integrator leader-follower multiagent system. As such, a plurality of BESSs 104 are controlled by the double-integrator leader-follower multi-agent approach. The mathematical equations are as below:

$$\dot{p}_i(t) = \gamma_1 \left[ a_{ir}(\eta_i - \eta_r) + \sum_{j \in \mathcal{N}_i} a_{ij}(\eta_i - \eta_j) \right] - \tag{22}$$

$$\gamma_2 \left[ \sum_{j \in \mathcal{N}_i} a_{ij}(\zeta_i - \zeta_j) + a_{ir}(\zeta_i - \zeta_r) \right] \forall i \in N$$

where, $\eta_i$ and $\zeta_i$ denote the multi-agent dynamics;
Subscript r denotes the leader's dynamics;
$\eta_i$ and $\eta_r$ denotes the ith follower and leader SOCs, respectively;
$\zeta_i$ is the ith follower power state;
$\zeta r$ denotes the leader power state.
$\gamma_i$ and $a_{ij}$ are the controller gain and the (i; j) element of the adjacency matrix, respectively.
The mathematical equation may also be written row-wise in terms of the Laplacian matrix or element-wise in terms of the adjacency matrix.
Further, $a_{ir}=1$ if the $i_{th}$ follower is connected to the leader and
$a_{ir}=0$ otherwise.
Referring back to FIG. 3, now the followers are controlled by the local consensus controller 308 by satisfying the consensus law equation (1) to collaborate among the BESS to simultaneously track the global signal $P_{DC}^{set}$ and achieve the consensus in SOC.

From equation (21) and using the $(P_{DC}^{set})$ the local consensus controller 308 is configured to compute minimum reference power $P*_{Set}$ for each BESS that indicates the minimum power each BESS must be operated on. Once the $P*_{Set}$ is computed, the local consensus controller 302 supplies the reference power $P*_{Set}$ to each battery. In an embodiment, supplying reference power to each battery indicates supplying the reference powers $P*_{Set}$ to lower-level controllers of bidirectional converters 114. Upon supplying the reference power, consensus controller 308 initiates tracking power and state of the charge of the leader and equalizes the power and state of charge (SOC) of the BESSs as the followers. In an embodiment, the consensus controller 308 tracks the leader power state and accordingly, equalize the SOC of each BESS using the following equation:

$$p_i(t) = p_j(t) \to p_o(t), \text{ as } t \to \infty \qquad (23)$$

$$s_i(t) = s_j(t) \to s_o(t), \text{ as } t \to \infty$$

Here, leader power state is defined as $$p_o(t) = p_{cc} \qquad (24)$$

$$p_o(t) = p_{cc}$$

Also, the ith power state of the BESS is defined to be within the range of $$-C^i_{rate} \le p_i(t) \le C^i_{rate} \qquad (25)$$

Also, the consensus controller 308 modifies or synchronizes the SOC of the BESS based upon the leader power using upon below equation:

$$\dot{s}_i(t) = \frac{-P^{Max}_i \times p_i(t)}{C^i_{Batt} \times 3600} \qquad (26)$$

where $C_{Batt}$ denotes i the $i^{th}$ BESS energy capacity in kWh. If the BESSs 104 are homogeneous, the power states, BESS powers in kW, and the SOCs are equalized if the consensus equation is satisfied. On the other hand, If the BESSs have different energy capacities i.e. heterogeneous, the power states and the SOCs remain equalized.

Accordingly, the local consensus controller 308 simultaneously tracks the leader power and equalize the power and SOC of each BESS 104 based upon a plurality of equations as described before. In an event, if there is fluctuation in the power of the leader, the SOC of the followers must be updated accordingly. As such, based at the time of fluctuation in the grid or microgrid, the ROCOF loop 202 computes the $\Delta P_{VSG}$, that indicates the necessary power for generating corresponding virtual inertia to be injected into the microgrid at the time of fluctuation. Based upon computed power $\Delta P_{VSG}$, control current for PWM is generated that is injected into the grid to nullify the grid disturbances or frequency fluctuation. The control current is transmitted to the VSI 306. Accordingly, the inertial response of a synchronous generator 110 is emulated by the virtual synchronous generator (VSG) during grid disruptions, to regulate and stabilize frequency of the islanded microgrid 102. At the same time, the control system 108 is configured to compute the global signal ($P_{DC}^{Set}$) based upon power values at the input and output terminals of the VSI 306. This global signal is transmitted to the local consensus controller 308 and a leader. The local control thus computes the reference power of each BESS 104 in the multi agent system and transmits the reference power to each BESS 104. Upon supplying the reference power, consensus controller 308 tracks power and state of the leader and equalizes the power and state of charge (SOC) of the BESSs 104 as the followers. In an embodiment, the consensus controller 308 tracks the leader power state and accordingly, equalize the power and SOC of each BESS.

FIG. 7 Illustrates graphs representing dynamic performance of a PLL 312, 400, according to an embodiment. The active and reactive power injections to the grid are based on the synchronization of the estimated phase angle of the PLL 312, 400. It is, therefore, necessary to examine the tracking capability of the PLL 312, 400 under different distorted signals. Accordingly, in order to examine the performance of the PLL 312, 400, a 60 Hz three-phase voltage as illustrated with a first plot 702, a second plot 704 and a third plot, all rated at 480 V RMS representing the islanded microgrid voltage was applied at the input of the PLL 312, 400. A fourth plot 708, a fifth plot 710 and a sixth plot 712 illustrates combinedly depicts a high-speed performance of the PLL 312, 400 in detecting the phase and the frequency after grid disruption. It was found that the designed PLL 312, 400 was able to successfully derive the q component to zero, thereby ensuring the d component's alignment to the grid voltage's magnitude.

FIG. 8 Illustrates graphs representing dynamic performance of a small signal model of an inverter 112, 210, 306, according to an embodiment. Generally, grid-tied inverters are coupled with the grid (i.e., $P_{cc}$) through an LC OR LCL filter 328 whose dynamics represent the inverter's output voltage and current. A seventh plot 802, an eighth plot 804 and a ninth plot 806 illustrates voltage waveforms of the inverter 112, 210, 306 sensed at the capacitor terminals. The capacitor is connected at the input terminal of the invertor 112, 210, 306. The inverters controls are designed to regulate respective $P_{ref}$ and $Q_{ref}$ following global setpoints, usually set by a system operator. The simulation is carried out on a 100 kW grid-following inverter. A simultaneous step change in $P_{ref}$ and $Q_{ref}$ is applied at t=0:1 s to examine the performance of the inverter in tracking the setpoints. A tenth plot 808 illustrated a waveform of $i_d$ current whereas an eleventh plot 810 illustrated a waveform of $i_q$ current. A twelfth plot 812 illustrates a pattern of active power P from the invertor, whereas a thirteenth plot 814 illustrates a reactive power Q. Further, a fourteenth plot 816 illustrates a pattern of $v_{ca}$ values through the invertor 112, 210, 306, whereas a fifteenth plot 818 illustrates a pattern of $I_{La}$ values through the invertor 112, 210, 306. A plurality of plots in FIG. 7 indicates that the inverter 112, 210, 306 quickly picked up the commanded set points without significant overshoots. Although, it was thought that the per-phase current and voltage of grid-following inverters 112, 210, 306 sending active power at a unity power factor to the grid are to be in phase, the pattern of twelfth plot 812 and a thirteenth plot 814 indicated that the current waveform is slightly shifted due to the presence of the reactive power Q.

FIG. 9 illustrates graphs representing dynamic analysis of a multi-agent system, according to an embodiment. The effectiveness of the cooperative controller in synchronizing the dynamic performance of multi-agent systems was observed. The dynamic performance was monitored when step changes were applied at t=50 Min and at t=60 Min, representing active power setpoints commanded by the system operator. A sixteenth plot 902 shows power pattern through a leader node. A seventeenth plot 904, an eighteenth plot 906, a nineteenth plot 908, a twentieth plot 910 and a twenty first plot 912 shows power pattern through a first, second, third, fourth and a fifth agent. Similarly, a twenty second plot 914, a twenty third plot 916, a twenty fourth plot 918, a twenty fifth plot 920, a twenty sixth plot 922 and a twenty seventh plot 924 shows power pattern of multi agent system after reaching consensus. Further, the twenty-eight plot 926 indicates a tracking mode of multi-agent system. A twenty ninth plot 928, a thirtieth plot 930, a thirtieth plot 932, a thirty first plot 934, a thirty second plot 936 and a thirty third plot 938 shows dynamic state of change patterns of multi agent system in consensus mode. Based upon a plurality of plots, it was observed that although the BESSs 104 have no initial power at the initialization, the units have to exchange the power to equalize the state of charge to satisfy the consensus protocol. After achieving consensus mode in power and energy, the batteries 104 quickly pick up the signal and follow the leaders discharging and charging powers.

FIG. 10 illustrates a microgrid frequency response under the cooperative consensus-based VSG 106, according to an embodiment. The small-signal models that describe the system's dynamics are used to examine the dynamic performance of the islanded microgrid 102. Microgrids dominated by renewable energy sources usually have shallow inertia constants and low damping properties. As such, during experimentation, the microgrid 102 was examined using $H_{\mu G}=0{:}083$ s and $D_{\mu G}=0{:}016$. A thirty fourth plot 1002 and a thirty fifth plot 1004 indicates the systems response, i.e. the grid frequency without and with the virtual inertia support, respectively. During analysis, step changes ware applied at t=55 s and t=70 s, that represents increment in the load and a connection of a RES unit, respectively. From both plots, it was concluded that the microgrid frequency response without inertial support undergoes larger ROCOF values. This causes a longer stabilizing time. With decrease in inertia level, the frequency response may even worsen. A thirty sixth plot 1008 and a thirty seventh plot 1006 indicates MAS individual power pattern without and with the virtual inertia support, respectively. The pattern indicates that the multi-agent system had reached a steady state mode (i.e., consensus mode) and was ready to pick up part of the generator's effect. Also, the step increase in load was translated into a discharging signal to the microgrid's BESSs. This command signal was received by the virtual leader L and was distributed among the followers through the pinning agent. Under a large share of RESs, the system's frequency experiences higher ROCOF values. Regulating the frequency without integrating the virtual inertia requires load-shedding initiation to prevent the system from a catastrophic collapse. Therefore, the power pattern indicated that the integration of virtual inertia successfully maintained the ROCOF values within the permissible bounds. Further, thirty eighth plot 1010 and a thirty ninth plot 1012 indicates synchronous machine's response without and with the cooperative control design, respectively. Also, fortieth plot 1014, forty first plot 1016, forty second plot 1018, forty third plot 1020, forty fourth plot 1022 and forty fifth plot 1024 indicates pattern of dynamic SOCs of MAS in consensus mode. Based upon a plurality of plots in FIG. 10, it was observed that when the cooperative controller was integrated, the generator produced lesser effort to sustain the disturbances. Based upon this observation, the contribution from the multi-agent system relieves the generator by supplying or absorbing the deficit power during the disturbances. When the consensus-based VSG is active, the SG and the MAS share the disruption according to their droop characteristics, under which the SG picks up the major effort due to its shallower droop gain. Furthermore, sustaining the frequency signal did not last long, and the major contribution from the MAS took place in the inertial response period (below 10 seconds). Accordingly, the MAS was planned to operate below the total maximum power at any time.

FIG. 11 illustrates performance of the decentralized VSG under highly noisy RES injection, according to an embodiment. To demonstrate the robustness of control design, the islanded microgrid was tested by setting the grid frequency at 40% of the nominal microgrid parameters i.e. $H_{\mu G}$, and $D_{\mu G}$. At 40% the nominal system inertia, a 5% step change was applied at t=55 s and t=70 s, representing a connection of a composite load or a loss of a generating unit and a connection of RES, respectively. A forty sixth plot 1102 and the forty seventh plot 1104 indicates the frequency response of the islanded microgrid 102 without and with the consensus-based virtual inertia unit, respectively. The plots 1102 and 1104 indicated that the frequency response of the microgrid 102 without inertial support experienced destabilizing wind oscillations and higher PV ROCOF values. On the contrary, with the inertial support, the frequency response shown a minimal overshoot and settling time, demonstrating the robustness of the control design. Further, a highly noisy signal was injected into the system at 30% of the nominal system inertia, that resembled a high penetration of RES. A forty-eight plot 1106 and the forty ninth plot 1108 indicates the frequency response of the islanded microgrid 102 without and with the consensus-based virtual inertia unit, respectively. Based upon the two plots, it was concluded that even under such severe disturbances, the consensus-based VSG could provide robust and optimal performance under extreme disruptions.

Further, the performance of a decentralized VSG was compared to a conventional centralized VSG, in terms of VSG power. Accordingly, a fiftieth plot 1110 and the fifty first plot 1112 indicates the VGS power pattern for a decentralized VSG and a centralized VSG, respectively. It was observed that the performance of the power pattern of the decentralized VSG was observed to be identical to the centralized algorithm.

Further, MAS individual powers were analyzed while providing inertial support during system transients. A superimposed fifty second plot 1114 indicates the individual power pattern of MAS. From the plot 1114, it was observed that that the dynamics of the synchronous machine evolved in a much smaller frequency bandwidth compared to the dynamics of the current controllers of the inverter 112, 210, 306. Typically, the dynamics of the current controllers evolves in the order of milliseconds. On the contrary, the dynamics of the synchronous generator manifest in the order of several units of twenty seconds. Therefore, latency and delays in the multi-agent system do not impact the control action provided to regulate the frequency.

Further, the system performance was tested without VSG and with the centralized and decentralized VSGs in terms of a plurality of parameters, such as maximum undershoot, maximum overshoot, frequency Nadir and Settling Time (Ts), as shown in Table 1. It was observed that the performance of the consensus-based VSG was identical to the centralized VSG, demonstrating the efficacy and robustness of the control strategy in improving the dynamic performance of the microgrid 102. The distributed VSG outperformed the centralized VSG by providing grid stabilization services and ensuring optimal operation for the distributed microgrid storage.

TABLE 1

| Performance metrics of the MG at 30% of $[H_{\mu G}, D_{\mu G}]$ | | | | |
|---|---|---|---|---|
| VSG Model | MUS | MOS | $f_{Nadir}$ | $T_s$ |
| No VSG control | 0.67 | 0.83 | 59.30 | 8.18 |
| Centralized VSG 32 | 0.29 | 0.19 | 59.71 | 1.9 |
| Decentralized VSG | 0.29 | 0.19 | 59.71 | 1.9 |

FIG. 12 illustrates a computer model of a microgrid 102 over a real-time digital simulator (RTDS) tool for validation purpose, according to an embodiment. In the RTDS tool, the designed microgrid includes conventional, as well as non-conventional distributed energy sources, such as a wind system 1202, a PV 1204, an EV 1206 etc. The microgrid 102 further includes a MAS inertial block 1208, a dynamic load block 1210, an L-G fault point block 1212, a GSN1 block 1214 and a Logic L-G fault block 1216. The grid is typically formed by the synchronous generator, and the remaining distributed energy sources are controlled and operated as grid-follower sources. The power injections from the wind system 1202, PV 1204, EV 1206, and the composite or dynamic load block 1210 are treated as disturbances to the system. A group of Li-ion batteries are situated behind bidirectional converters (not shown) to form a multi-agent system. The entire multi-agent system is integrated into the grid through a grid-tied inverter coupled with an LCL filter. The multiagent system and the grid-inverter are controlled to emulate the inertia of the synchronous generators and regulate the frequency of the islanded microgrid 102. The distributed controller is further constructed as a C-code at 50 μs to match the simulation time in the RTDS tool. The inputs to the system in the RTDS tool are the real-time signals provided by the RTDS models during real-time simulation. The outputs are the command signals sent to the lower-level controllers of the bidirectional converters attached to the batteries. A real-time simulation is then performed in the runtime environment using the same operating conditions to verify the small signal model and validate the control design. The dynamic analysis of the microgrid benchmark in the RTDS runtime environment is now described in detail in FIG. 13.

FIG. 13A illustrates the frequency response of a microgrid 102 as a dynamic analysis of the microgrid benchmark in the RTDS tool when virtual synchronous generator is inactive, according to an embodiment. The synchronous generator is initialized in a lock mode at the startup to reduce the transients. Once the steady state is reached, the synchronous generator is released, in which the AGC becomes active and eliminates the steady state error. A plurality of RES units are further energized sequentially to examine the ability of the cooperative controller to provide inertia emulation and balance the dynamic SOC of the distributed BESSs. A fifty third plot 1302 shows the frequency response of the microgrid after a sudden change in the load when the virtual inertia loop is integrated but inactive. A fifty fourth plot 1304 indicates the power pattern through the microgrid. A fifty fifth plot 1306 indicates the power pattern through the decentralized VSG. An overlapping fifty sixth plot 1308 indicates the power pattern through the multiagent system. A fifty seventh plot 1310 indicates a pattern of state of charge on a plurality of batteries. The circuit breaker connecting the VSG to the microgrid was kept open. Based upon a plurality of plots, it was observed that when the ROCOF loop was energized and receives the frequency deviation in the system, the multi-agent system gets energized and achieved consensus.

FIG. 13B illustrates a frequency response of a microgrid 102 as a dynamic analysis of the microgrid benchmark in RTDS tool when the virtual synchronous generator is active, according to an embodiment. In this case, the circuit breaker was closed and the microgrid was tested by applying a step increase in the load. A fifty eighth plot 1312 again shows the frequency response of the microgrid after a sudden change in the load when the virtual inertia loop is active. A fifty ninth plot 1314 indicates the power pattern through the microgrid. A sixtieth plot 1316 indicates the power pattern through the decentralized VSG. Overlapping sixty first plot

1318 indicates the power pattern through the multiagent system. A sixth second plot 1320 indicates a pattern of state of charge on a group of batteries. Based upon a plurality of plots, it was observed that the multi-agent system acted as an energy buffer and picked up part of the load and thus emulated the generator response after grid disruptions. The batteries effectively discharged their powers in a consensus fashion after reaching steady state mode. The batteries collaboratively regulated the frequency, thus satisfying the cooperative controller. It indicates that the control scheme could be applied to a realistic system and achieve the control objectives. Further it was also observed that integrating the virtual inertia loop helps to arrest the Rate of Change of Frequency (ROCOF) values and minimizes the frequency nadir.

FIG. 14 illustrates a complete layout of the microgrid in the RTDS environment 1400, according to an embodiment. A plurality of components and their connectivity is shown in the environment. The plurality of components includes a virtual synchronous generator 1402, a synchronous generator 1404 and a utility grid 1406. The plurality of components may further include a battery connection 1408, a PV system 1410, a wind-based system 1412, and a dynamic load 1414, collectively represented as the layout of the microgrid 102.

FIG. 15 illustrates a distributed consensus controller into the RTDS environment 1500, according to an embodiment. The consensus controller is designed to operate in a time step of 50 μsec in the RTDS environment. The designed consensus controller has a plurality of input nodes for receiving signals from the BESS, node of receiving virtual power ($\Delta P_{VSG}$) required to inject into the microgrid at the time of disturbance and a plurality of other nodes. The designed consensus controller has a plurality of output nodes for proving reference power for followers and the leader.

FIG. 16 illustrates another benchmark system for the microgrid in the RTDS environment 1600, according to an embodiment. In the RTDS tool, the designed microgrid includes a plurality of distributed energy sources such as a wind turbine 1602, a PV 1604, an EV charging system 1606 etc. The microgrid further includes a virtual inertia generation block 1608, a dynamic load block 1610, an L-G fault point block 1612, a GSN1 block 1614 and a Logic L-G fault block 1616. The details about the microgrid in the RTDS environment is elaborated with reference to FIG. 12 and is therefore not repeated herein.

FIG. 17 illustrates model of the synchronous generator (SG) in used in the microgrid in the RTDS environment 1700, according to an embodiment. Here, all hierarchal boxes include the associated power system components and control schemes. The SG model contains STAB1 block 1702 coupled with an excitation system 1704, a generator block 1706 and governor block 1708 coupled with the generator block 1706. The SG model may further include a generator control block 1710 for controlling the operation of the SG in the RTDS environment 1700.

FIG. 18 illustrates a structure of the governor in the RTDS environment 1800, according to an embodiment. The governor is used for coordinating the operation of the synchronous generator (SG) and includes a plurality of computation blocks.

FIG. 19 illustrates structure of a wind turbine based-doubly-fed induction generator (DFIG) in the RTDS environment 1900, according to an embodiment. The model of the DFIG includes a plurality of components, for example, a rotor axis control block 1902, a grid VSC control block 1904, a wind turbine and multimass block 1906, an average model DC link block 1908 and a startup timer and crowbar control block 1910. The model of the DFID further includes a grid voltage/source voltage block 1912 and a rotation mechanism block 1914.

FIG. 20 illustrates a flowchart of a control method 2000 for a power distribution system 100, according to an embodiment. The power distribution system 100 having an islanded microgrid 102 including a plurality of battery energy storage systems 104 operating as a primary energy source and a decentralized consensus-based virtual synchronous generator 106. The method 1300 is described in conjunction with FIGS. 1-6 and a plurality of experiment observations in FIGS. 5-19. Various steps of the method 2000 are included through blocks in FIG. 20. One or more blocks may be combined or eliminated to achieve control method 2000 for a power distribution system 100, without departing from the scope of the present disclosure.

At step 2002, the method 2000 includes, simultaneously, emulating inertial response of a synchronous generator 110 by the virtual synchronous generator 106 during grid disruptions, to regulate and stabilize frequency of an islanded microgrid 102.

At step 2004, the method 2000 includes measuring maintaining consensus among the plurality of battery energy storage systems (BESSs) 104 operating as a primary energy source in the VSG 106.

The above-described hardware or software or method description is a non-limiting example of corresponding structure for performing the functionality described herein. A decentralized consensus based-virtual synchronous generator has been presented to equalize the SOC of microgrid storage systems and regulate the frequency of an islanded microgrid during grid disruptions, acting as a grid-forming unit. A novel cooperative controller is therefor designed and configured that adjusts the output power of the BESS to balance the SOC while providing inertial support to the microgrid, thus emulating the inertial response of the synchronous generator. The simulations have shown that the consensus-based virtual inertia control scheme can be applied to regulate the frequency and control the operating Energy Storage Systems (ESSs) in a distributed fashion so that no battery is depleted when available capacity exists in the remaining ESSs, offering advantages over centralized control strategies in terms of robustness and utilization. The real-time analyses have been performed using RTDS tool, demonstrating the performance of the enhanced consensus-based VSG under various RESs injections.

Numerous modifications and variations of the present disclosure are possible in light of the above teachings. It is therefore to be understood that the invention may be practiced otherwise than as specifically described herein.

The invention claimed is:

1. A power distribution system comprising:
a virtual synchronous generator (VSG) comprising:
a plurality of batteries, each battery having a State of Charge (SOC) and a power, the plurality of batteries being interconnected to form a battery bank, the battery bank further comprising a consensus control circuitry which is configured to equilibrate the SOCs of the batteries to establish and maintain an SOC consensus, and equilibrate the powers of the batteries to establish and maintain a power consensus amongst the plurality of batteries;
a grid-connected inverter;
a bidirectional converter; and
a processing circuitry configured to monitor an electrical frequency of the power distribution system, activate the VSG when an electrical frequency fluctuation is detected, and nullify an electrical frequency fluctuation in an electrical frequency of the power distribution system with virtual inertia, wherein each battery of the plurality of batteries further comprises a battery control circuitry, each battery control circuitry being configured to connect to the consensus control circuitry and to each other battery control circuitry,
the consensus control circuitry selects a single battery of the plurality of batteries as a leader-agent,
the consensus control circuitry designates each batteries of the plurality of batteries which are not selected as the leader-agent to be follower-agents,
the battery control circuitry is configured to establish and maintain the SOC consensus by equilibrating the SOCs of the follower-agents with the SOC of the leader-agent;
the battery control circuitry is further configured to establish and maintain the power consensus of the plurality of batteries by equilibrating the powers of the follower-agents with the power of the leader-agent, and
the consensus control circuitry is further configured to track and adjust the power and the SOC of the leader-agent.

2. The power distribution system of claim 1, wherein the processing circuitry is further configured to utilize the VSG to form a decentralized power grid.

3. The power distribution system of claim 1, wherein the VSG is configured to regulate the electrical frequency of the power distribution system through a rate of change of frequency (ROCOF) control loop.

4. The power distribution system of claim 1, wherein the power distribution system further comprises:
a synchronous generator; and
a doubly fed induction generator.

5. The power distribution system of claim 2, wherein the grid-connected inverter is configured to connect the power distribution system to a primary electrical grid.

6. The power distribution system of claim 5, wherein each battery of the plurality of batteries are comprised of heterogeneous lithium-ion batteries, and each battery of the plurality of batteries are attached to a DC-link of the grid-connected inverter.

7. The power distribution system of claim 1 wherein the consensus control circuitry is configured to adjust the power and the SOC of the leader-agent according to a global leader signal.

8. The power distribution system of claim 2, wherein the consensus control circuitry is configured to generate an individual reference power and send the individual reference power to a lower-level controller of the bidirectional converter.

9. The power distribution system of claim 2, wherein the consensus control circuitry is configured to equalize the SOC of the plurality of batteries in the battery bank.

10. A control method for a power distribution system, the method comprising:
monitoring, with a processing circuitry, an electrical frequency of the power distribution system for an electrical frequency fluctuation;
activating, with the processing circuitry, a virtual synchronous generator (VSG) to nullify the electrical frequency fluctuation with virtual inertia; and
monitoring, with a consensus control circuitry, a State of Charge (SOC) and a power of each battery of a plurality of batteries, the plurality of batteries being interconnected to form a battery bank, wherein the consensus control circuitry is further configured to equilibrate the SOCs of the batteries to establish and maintain an SOC consensus and equilibrate the powers of the batteries to establish and maintain a power consensus amongst the plurality of batteries, each battery of the plurality of batteries further comprises a battery control circuitry, each battery control circuitry being configured to connect to the consensus control circuitry and to each other battery control circuitry, the consensus control circuitry selects a single battery of the plurality of batteries as a leader-agent, the consensus control circuitry designates the batteries of the plurality of batteries which are not selected as the leader-agent to be follower-agents, the battery control circuitry is configured to establish and maintain the SOC consensus by equilibrating the SOCs of the follower-agents with the SOC of the leader-agent, the battery control circuitry is further configured to establish and maintain the power consensus of the plurality of batteries by equilibrating the powers of the follower-agents with the power of the leader-agent, and the consensus control circuitry is further configured to track and adjust the power and the SOC of the leader-agent.

11. The control method of claim 10, wherein the VSG further comprises a grid-connected inverter and a bidirectional converter, and wherein the processing circuitry is further configured to utilize the plurality of batteries and the VSG to form a decentralized power grid.

12. The power distribution system of claim 10, wherein the VSG is configured to regulate the electrical frequency of the power distribution system through a rate of change of frequency (ROCOF) control loop.

\* \* \* \* \*